US012193577B2

(12) United States Patent
Anstey

(10) Patent No.: US 12,193,577 B2
(45) Date of Patent: Jan. 14, 2025

(54) COMPUTER-IMPLEMENTED PLATFORM FOR TRACKING AND ANALYZING CUSTOMER-MATTRESS INTERACTIONS

(71) Applicant: SLEEP SYSTEMS INCORPORATED, Calgary (CA)

(72) Inventor: Stephen Thomas Anstey, Calgary (CA)

(73) Assignee: SLEEP SYSTEMS INCORPORATED (CA)

(*) Notice: Subject to any disclaimer, the term of this patent is extended or adjusted under 35 U.S.C. 154(b) by 266 days.

(21) Appl. No.: 17/982,793

(22) PCT Filed: Apr. 30, 2021

(86) PCT No.: PCT/CA2021/050601
§ 371 (c)(1),
(2) Date: Nov. 8, 2022

(87) PCT Pub. No.: WO2021/223015
PCT Pub. Date: Nov. 11, 2021

(65) Prior Publication Data
US 2023/0139923 A1    May 4, 2023

(30) Foreign Application Priority Data

May 8, 2020 (CA) .................................. CA 3080754

(51) Int. Cl.
*G06N 3/08* (2023.01)
*A47C 27/08* (2006.01)
*A47C 31/12* (2006.01)

(52) U.S. Cl.
CPC .......... *A47C 31/123* (2013.01); *A47C 27/083* (2013.01)

(58) Field of Classification Search
CPC ...... A47C 31/123; A47C 27/083; G06Q 3/00; G06Q 30/02; G06N 3/08
See application file for complete search history.

(56) References Cited

U.S. PATENT DOCUMENTS

| 8,676,662 B1* | 3/2014 | Roberts | G06Q 30/0631 |
| | | | 705/26.1 |
| 10,776,853 B2* | 9/2020 | Takahashi | G06Q 30/0269 |
| 2007/0238935 A1* | 10/2007 | Boyd | A47C 31/123 |
| | | | 600/300 |

\* cited by examiner

*Primary Examiner* — Fredrick C Conley
(74) *Attorney, Agent, or Firm* — Joy S. Goudie

(57) ABSTRACT

A customer's affinity towards a plurality of mattresses displayed in a brick and mortar store is determined. The probability of the customer purchasing at least one of the displayed mattresses is extrapolated based on the customer's affinity towards each of the mattresses. Customer engagement with each of the mattresses is determined based on the pressure data obtained from embedded pressure sensors responsive to the body pressure. The pressure data and the information indicative of a total number of positions taken up by the customer on each of the mattresses, time spent by the customer on each of the mattresses in each of the positions, and the total time spent by the customer on each of the mattresses are fed to a neural network as inputs, with the neural network determining an affinity score indicative of the customer's affinity towards each of the mattresses.

22 Claims, 7 Drawing Sheets

COMPUTER-IMPLEMENTED PLATFORM FOR TRACKING AND ANALYZING CUSTOMER-MATTRESS INTERACTIONS

TECHNICAL FIELD

The present disclosure relates to computer-implemented systems and methods that track and analyze customer sentiments. Particularly, the present disclosure relates to systems and methods that track, programmatically analyze, and deduce sales-related inferences from customers' interactions with bedding mattresses offered for sale in brick and mortar stores.

Definition of the Terms Used in the Present Disclosure

The term 'brick and mortar stores,' as used in the present disclosure, relates to tangible and physical stores offering, inter-alia, mattresses and allied products (including bedsheets, pillows, and furniture such as sofa, recliner, and the like) for sale.

The term 'mattress test,' as used in the present disclosure, refers to a customer testing various aspects of a mattress-including comfort levels, the softness of the mattress, spinal alignment, compatibility with a variety of sleeping postures, response of the mattress to the body pressure, and the like—by occupying various sitting and sleeping positions on the mattress.

The term 'engagement,' used interchangeably with the term 'interaction,' describes the activities performed by a customer on a mattress and in reference to a mattress, viz., sitting and sleeping on a mattress, changing positions on a mattress, and implementation of web-based activities corresponding to a mattress (visiting web pages describing a mattress, visiting social media pages that describe mattresses, viewing the description of a mattress on an online web page, and the like).

The term 'level of engagement,' used interchangeably with the term 'level of interaction,' defines the extent to which a customer engages with a mattress. The extent to which a customer engages with a mattress is determined inter-alia by the total time spent (by the customer) on the mattress and the web activities performed by the customer (viz., viewing the description of a mattress on an online web page, viewing a webpage dedicated to a mattress, watching video describing a mattress, searching for mattress descriptions online, and the like).

The term 'affinity score,' as used in the present disclosure, quantifies a customer's affinity towards a particular mattress and serves as a basis for determining the probability that the customer would purchase the said particular mattress.

The term 'pressure effect,' as used in the present disclosure, refers to the cumulative pressure value recorded (sensed) by a cluster of activated sensors.

BACKGROUND

Comfortable sleep is influenced more often than not by a mattress that is in line with the physical characteristics of the user, and responsive to, inter-alia, different pressure points caused by the sleeping positions taken up by the user. And therefore, a mattress has to be appropriately tested before concluding the sale. While online e-commerce platforms that indulge in sales of mattresses, among other products, do not provide customers with an opportunity to interact with or test the mattress that they intend to buy, the variety on offer in terms of brands and types of mattresses available notwithstanding. However, conventional brick and mortar mattress retail outlets (brick and mortar stores), while offering a multitude of mattress types and brands, at varied price points, also allow (prospective) customers to engage and interact with the displayed mattresses, thereby testing the displayed mattresses for conformity with various parameters including softness, firmness rating, levels of comfort on offer, response to the application of body pressure, firmness retention, durability, and the like. The testing of mattresses (displayed for sale in a brick and mortar stores) by potential customers or the interaction of potential customers with the mattresses could often provide retailers and manufactures alike with valuable information about customer behavior, customer preferences, customer buying patterns, and the probability that a customer would choose to buy a particular mattress after testing the same.

However, traditional brick and mortar stores lack the infrastructure necessary to track and analyze customer-mattress interactions (engagements), unlike their online counterparts whose business model is entirely reliant upon computerized and software-driven models which are also pre-programmed to minutely track and analyze customer behavior and deduce customer preferences, customer buying patterns, and the probability of a customer buying a particular item offered on sale. Traditional brick and mortar stores, while mindful of the importance of customer-mattress interaction data and the viability of the customer-mattress interaction data as the central stepping stone for deducing customer behavior, customer preferences, and customer buying patterns inter-alia, often fail to minutely capture it, given their reliance on a traditional business model which often designates salespersons and store managers as responsible for selling mattresses as well as eliciting customer response and analyzing the customer response to deduce suitable marketing and sales related business decisions. Moreover, in recent times, online e-commerce platforms have extended their business reach by establishing brick and mortar namesakes that also offer customers the convenient option of interacting/engaging with a multitude of mattresses before concluding a mattress sale, thereby providing a tough competition to the brick and mortar stores who, hitherto, considered physical display of mattresses and the possibility of customers engaging/interacting with the said physically displayed mattresses, as their Unique Selling Proposition (USP).

The foray of online e-commerce platforms into physical retail store-based business notwithstanding, it is possible that, at times, multiple customers simultaneously (or near-simultaneously) walk into a brick and mortar store to check upon mattresses offered for sale. With the presence of multiple customers, the need to proactively engage every customer and provide attention to his individual needs, requirements, and preferences becomes paramount. Sales personnel and store managers who are expected to proactively engage every customer and simultaneously track and analyze individual customer behavior (to deduce customer buying patterns and preferences therefrom) are likely to miss certain customers and consequentially their interactions with certain mattresses. And therefore, to obviate the phenomenon of sales personnel and store managers inadvertently missing tracking of certain customers and their interactions with mattresses, some of the brick and mortar stores resorted to installing beacons that, in turn, track the movement of customers (within the stores) and subsequently alert salespersons about the customers' locations. Notwithstanding that beacons may not always accurately pinpoint customers' locations (within the store), they are not programmed to detect positions taken up by customers on mattresses as a part of the process of interacting with/testing the mattresses.

Further, beacons are also not programmed to detect the total number of customers interacting with/testing a mattress (by way of either sitting on the mattress or sleeping on the mattress). While it is appropriate that the data generated from beacons could only be used as a supplement to ascertain the general location of customers, relying on beacons alone for customer location data is bound to prove counter-productive given the aforementioned limitations associated with beacons.

Further, traffic counters that, once strategically placed, count the number of customers walking into and walking out of stores, were used in certain brick and mortar stores as either an alternative to the beacons, or in combination with beacons to supplement the positioned data generated by the beacons. However, since traffic counters, as the name suggests, are restricted to counting the number of customers walking in and out of the stores, they are rendered incapable of programmatically interrelating the total number of customers walking in and out of the store, to the total number of mattresses that each of the customers may have interacted with, and engagement levels, and, in turn, the affinity exhibited by each of the customers towards the mattresses displayed in a brick and mortar store, which, in turn, have been proven to be vital parameters for determining the efficiency and viability of the business (undertaken at the brick and mortar store).

Given the non-suitability of traffic counters to the business model adopted by traditional brick and mortar stores, and the shortcomings of relying solely on beacons for eliciting data describing customers' in-store locations, one of the major challenges is to make traditional brick and mortar stores impersonate their online counterparts (i.e., online e-commerce platforms selling mattresses) in tracking and analyzing customer behavior and deducing at least customer preferences and buying patterns therefrom. In addition to the need to impersonate their online counterparts in tracking and analyzing customer behavior, brick and mortar stores also face difficulties in terms of correlating customer behavior and the in-store sales related information derived from the accounting software. While Google Analytics™ was the preferred service provider of online e-commerce platforms for tracking and analyzing the behavior of (e-commerce platforms) visitors, the capabilities of Google Analytics™ could not be extrapolated to conventional brick and mortar stores for they lacked the supporting computer-networking infrastructure necessary for accommodating and utilizing the analytical services offered by Google Analytics™.

Moreover, since brick and mortar stores typically rely upon human inputs, i.e., inputs from salespeople and store managers, to understand customer behavior and deduce customer preferences and buying patterns therefrom, the typical customer feedback loop utilized by traditional brick and mortar stores is typically not conducive to the integration with software-driven, computer networking infrastructure dependent Google Analytics™ platform. And even if, at least hypothetically, brick and mortar stores were able to overcome the difficulties associated with tracking and analyzing the behavior of in-store customers, their goal of minutely tracking and analyzing customer behavior in entirety is likely to be hindered by the inability to track customers' online activities, at least those online activities deemed relevant to the mattresses offered for sale by brick and mortar stores.

And therefore, given the drawbacks discussed hitherto, there was felt a need for a computer-implemented method, system, and computer program product directed especially at traditional brick and mortar stores, and configured to minutely track and analyze not only customers' in-store activities, including customers engaging with/interacting with specific mattresses, but also customers' online activities, and more specifically, at least the online activities relevant to the mattresses displayed at the brick and mortar stores. There was also felt a need for a computer-implemented method, system, and computer program product configured to be seamlessly integrated with mattress recommendation systems, for improved cross-platform data sharing and decision making. Further, there was also felt a need for a computer-implemented method, system, and computer program product that takes into consideration customers' interactions with mattresses displayed in-store, the manner in which customers engage with the mattresses displayed in-store, and subsequently combines the information indicative of customers' in-store activity with customers' relevant online activities, to deduce customers' affinity towards each of the mattresses displayed in-store, and to calculate the probability of customers' purchasing any of the mattresses displayed in-store.

Objects

An object of the present disclosure is to quantitatively determine customers' engagement with a plurality of mattresses displayed for sale in a brick and mortar store.

Yet another object of the present disclosure is to enable brick and mortar store owners (for example, retailers) to accurately identify customers' affinity towards a plurality of mattresses, based on a combined and computerized analysis of the total number of mattress units sold and the customers' levels of engagement with each of the mattresses displayed for sale in a brick and mortar store.

Still, a further object of the present disclosure is to enable brick and mortar store owners to accurately determine the total number of customers engaging with a plurality of mattresses displayed for sale therein.

Yet another object of the present disclosure is to enable brick and mortar store owners to forecast with reasonable accuracy, the probability that a particular customer would purchase a particular mattress, and seamlessly extrapolate, with reasonable accuracy, the said probability to a multitude of customers and mattresses.

One more object of the present disclosure is to enable brick and mortar store owners to track the total number of customers engaging with each of the mattresses displayed for sale.

Yet another object of the present disclosure is to envisage a computer-implemented system, method, and computer program product that allows for a definite identification of a total number of people, viz., solo, duo, trio, and the like, engaging with a particular mattress displayed for sale. Another object of the present disclosure is to envisage a computer-implemented system, method, and computer program product that facilitates an accurate calculation of mattress sales volumes, based on customers' levels of engagement with each of the mattresses displayed for sale in a brick and mortar store.

Yet another object of the present disclosure is to envisage a cloud-based computer-implemented system, method, and computer program product that facilitates segregation and analysis of mattress related data points extracted from a plurality of geographically displaced brick and mortar stores One more object of the present disclosure is to envisage a computer-implemented system, method, and computer program product that not only tracks and analyzes customer behavior based on customer's interactions with mattresses displayed in a brick and mortar store, but also provides for salespersons' locations to be tracked relative to the location of customers, and for hypothesizing customer-salesperson interactions based on customers' and salespersons' locations.

Still, a further object of the present disclosure is to envisage a computer-implemented system, method, and computer program product that overcome the disadvantages associated with conventional beacons and traffic counters, in terms of tracking and analyzing customer behavior, and deducing customer preference and buying patterns therefrom.

Yet another object of the present disclosure is to envisage a computer-implemented system, method and computer program product that allows for customers' activities, both online as well as offline, to be accurately tracked and quantified in terms of affiliation with one or more mattresses displayed for sale in a brick and mortar store.

One more object of the present disclosure is to envisage a computer-implemented system, method, and computer program product that bridges the gap between the availability and analysis of information corresponding to customers' online shopping activities and customers' activities across a brick and mortar store.

Still, a further object of the present disclosure is to envisage a computer-implemented system, method, and computer program product that could be seamlessly integrated with a plurality of third-party mattress recommendation systems, Point-of-Sale (POS) accounting systems, and customer tracking applications inter-alia.

Yet another object of the present disclosure is to envisage a computer-implemented system, method and computer program product that facilitates seamless integration of online and offline shopping metrics related to mattress shopping, and thus enables improved retail data analysis of shopping-related activities occurring at brick and mattress stores.

One more object of the present disclosure is to envisage a computer-implemented system, method and computer program product that aids in optimization of store space in brick and mortar stores, and also provides pointers for positioning of mattresses on the stores' space, based on an identification of highly engaged mattresses, mattresses with a higher purchase rate, and mattresses attributed with comparatively higher levels of customer affinity inter-alia.

Still, a further object of the present disclosure is to envisage a computer-implemented system, method and computer program product that generates pointers directed to mattress product and brand mix based on the identification of highly engaged mattresses, mattress with a higher purchase rate, and mattress attributed with comparatively higher levels of customer affinity inter-alia.

SUMMARY

The present disclosure envisages a computer-implemented system, method and a computer program product for tracking and analyzing customers' activities at brick and mortar stores selling mattresses, and for deriving customers' affinity toward the said mattresses and the probability of customers purchasing any of the said mattresses. In accordance with the present disclosure, each of a plurality of mattresses displayed within a brick and mortar store is embedded with the combination of pressure sensors, a beacon, and a microcontroller.

Typically, any customer visiting the brick and mortar store is prompted-ostensibly via a push notification delivered to his handheld device-either to install on his handheld device (i.e., smartphone) a progressive web application illustrating in detail, among others, the mattresses displayed in the brick and mortar store. Alternatively, the customer could be prompted, via a push notification delivered onto his handheld device, to access (without installation) the progressive web application, by feeding his bibliographic information thereto. Alternatively, the customer could also be prompted, ostensibly via a push notification delivered onto his handheld device when a primary beacon or traffic counter detects the customer as entering (or about to enter) the brick and mortar store, to scan a predetermined QR code affixed to a predetermined location within the brick and mortar store. The scanning of the QR code typically triggers the launch of the progressive web application on the customer's handheld device. Subsequently, the progressive web application launched on the customer's handheld device associates the customer's handheld device and, in turn, the customer with a unique identifier (for example, a unique customer ID C1). In the event that a customer identified as not having access to his handheld device and, in turn, the progressive web application, then such a customer is manually assigned a customer ID, ostensibly by a store manager or a stores salesperson. Even in the event when a customer is not using his handheld device and consequentially the progressive web application, such a customer would be manually assigned a customer ID, either by the store manager or the stores salesperson. And the bibliographic details of such a customer, along with the manually assigned customer ID, are manually entered into a user interface accessible via a computer-based device located within the premises of the brick and mortar store, and are consequentially stored on a memory module installed within the computer-based device for further reference and analysis. Essentially, in addition to manually assigning a customer ID, the sales person is preferably enabled to manually confirm the mattress ID attributed to the mattress with which a customer is engaging/interacting at a particular point in time, by entering the mattress ID onto a native retail application executed on a tablet device rendered accessible to the sales person.

The unique identifier identifying the customer is transmitted into a computer-based device located, preferably within the brick and mortar store, via well-known telecommunication techniques including, for example, General Packet Radio Services (GPRS). Subsequently, the computer-based device, and in particular, the processor embedded therein, creates a log identifying the customer via his unique identifier. And subsequently, when the customer starts strolling across the floor of the brick and mortar store, checking out various mattresses in the process, the beacons embedded within each of the mattresses track and determine the user's relative position, via the progressive web application installed within the customer's handheld device.

For instance, when the customer is in close proximity to a mattress M1, the beacon embedded within mattress M1 detects the customer's proximity, by wirelessly communicating with the customer's handheld device, and subsequently transmits the customer's unique ID (i.e., C1) to the microcontroller 204 along with a timestamp (indicative of the time of the day at which the customer was in close proximity to a mattress). Subsequently, the microcontroller appends the mattress ID (indicative of the mattress determined to be in close proximity to the customer) to the combination of the customer ID and timestamp to the processor embedded within the computer-based device (located preferably within the store). Subsequently, when the customer proceeds to sit upon or lie down on mattress identified by mattress ID M1—as a part of testing or engaging with the mattress M1—the customer's location as identified by the beacon to be in proximity to the mattress identified by mattress ID M1 is augmented/buttressed by the customer C1 proceeding—almost immediately, or within a short period vis-a-vis the timestamp determined by the beacon—to test or engage with the mattress M1. And when the customer sits upon or lies down on the mattress M1, at least some of the pressure sensors embedded therein are activated.

The activated pressure sensors trigger the microcontroller, which, in turn, calculates the total number of activated pressure sensors triggered, the sequence of activated pressure sensors, and the cumulative pressure effect exhibited by the activated pressure sensors. The microcontroller appends the information indicative of the total number of activated pressure sensors triggered, the sequence of activated pressure sensors, and the cumulative pressure effect exhibited by the activated pressure sensors (collectively referred to as the 'sensed pressure data') to the mattress ID (i.e., M1) and the customer ID (C1), and transmits to the processor embedded within the computer-based device.

In accordance with the present disclosure, the processor, on its part, confirms the customer's (identified by unique customer ID C1) presence on mattress M1, based on the analysis of the location data derived from the beacon installed within mattress M1 and the total number of activated pressure sensors triggered (on mattress M1), the sequence of activated pressure sensors (on mattress M1), and the cumulative pressure effect exhibited by the activated pressure sensors (on mattress M1). Additionally, the processor also tracks the progressive web application installed on the customer's handheld device to determine if the customer has performed any web activity relevant to the mattress M1. Ostensibly, any web activities performed by the customer on the progressive web application and with reference to the mattress M1 are tracked based on customer ID (C1) linked to the progressive web application.

Additionally, based on the total number of activated pressure sensors triggered (on mattress M1), the sequence of activated pressure sensors (on mattress M1), and the cumulative pressure effect exhibited by the activated pressure sensors (on mattress M1), the processor (embedded within the computer-based device) determines the total number of positions occupied by the customer on the mattress M1, the types of positions (i.e., sitting position, sleeping position) occupied by the customer on the mattress M1, the time spent by the customer (on mattress M1) in each of the positions, and the total time spent by the customer on the mattress M1 The processor subsequently inputs the data points (mentioned above) to a neural network and trains the neural network to perform a pattern recognition operation directed at identifying patterns in the positions taken up by the customers, total time spent by the customers in each of the positions, total time spent by the customers on the mattresses, sleeping positions taken up by the customers, sitting positions taken up by the customers, the total number of activated pressure sensors for sitting positions and sleeping positions, the sequence of activated pressure sensors for sleeping positions and sitting positions, and the cumulative pressure effect exhibited by the activated pressure sensors for sleeping positions and sitting positions inter-alia. The patterns thus identified by the neural network are used, again, to train the neural network to improvise on the pattern recognition operation.

And based on at least the total number of positions occupied by the customer on the mattress M1, the type of positions (i.e., sitting position, sleeping position) occupied by the customer on the mattress M1, the time spent by the customer (on mattress M1) in each of the positions, and the total time spent by the customer on the mattress M1, the processor determines the customer's affinity towards mattress M1 and extrapolates the affinity thus determined to an affinity score arranged on a predetermined scale. And the affinity score is subsequently extrapolated by the processor to determine the probability of the customer buying the mattress M1. The procedure discussed above is repeated for every mattress displayed for sale within the brick and mortar store and for every customer visiting the brick and mortar store, with affinity scores calculated for every possible mattress-customer pairing. The procedure also involves the calculation of a mattress sales conversion rate', which, in turn, is expressed as a function of the number of times different customers engaged a particular mattress and the total unit sales attributable to the said particular mattress. The procedure for the calculation of 'mattress sales conversion rate' is extrapolated for every mattress displayed for sale on the brick and mortar store.

In the event a customer is not using his handheld device within the premises of the brick and mortar store or does not have access to his handheld device while he is in the premises of the brick and mortar store, then in such a case it is ostensible that such a customer may not have been assigned with a unique customer ID if the store manager or store sales personnel fail to timely notice the said customer's entry into the brick and mortar store. And under such circumstance, the customer could start interacting/engaging with the mattresses displayed within the brick and mortar store despite having not been assigned unique customer ID that would differentiate him from the other customers and also track him and his engagement with the mattresses displayed across the brick and mortar store. In such a case, preferably, when the customer engages, for the first time, with a mattress displayed in the brick and mortar store, the microcontroller embedded with the mattress detects the presence of the customer based on the activation of at least some of the pressure sensors therein. Ostensibly, the activation of any of the pressure sensors signals the presence of the customer on the mattress. And therefore, the microcontroller embedded within the mattress transmits the combination of the mattress ID and the sensed pressure data to the processor installed within the computer-based device. The processor, in this case, takes into cognizance the absence of a unique customer ID and accordingly generates and associates-programmatically and anonymously-a unique customer ID, with the combination of the mattress ID and the sensed pressure data.

And any subsequent mattress engagements/interactions performed by the said customer, and the information (i.e., the combination of mattress IDs and corresponding sensed pressure data) emanating from such subsequent mattress engagements/interactions are programmatically linked to the unique customer ID generated by the processor. Additionally, while linking the combination of mattress IDs and corresponding sensed pressure data to the customer ID generated by the processor, the time stamps associated with the combination of the mattress IDs and corresponding sensed pressure data could be programmatically verified against time periods pre-estimated as required for the customer to travel from the first mattress to the subsequent mattresses, to confirm that it was indeed the same customer who moved from the first mattress to interact with/engage the subsequent mattresses. Further, since the sensed pressure data emanating from a customer's interaction/engagement with a mattress is interlinked to a corresponding unique customer ID and a corresponding unique mattress ID, the combination of the (unique) customer ID, (unique) mattress ID and the (customer-specific) sensed pressure data could be considered as a unique customer-mattress interaction profile. Ostensibly, the customer-mattress interaction profile could be used to correlate at least the customer ID to the sensed pressure data emanating from different mattresses (i.e., mattresses other than the one identified by the mattress ID), but embodying substantially similar data points.

In accordance with the present disclosure, an indoor store map programmatically mirroring the layout of the brick and mortar store and the arrangement (positioning) of the mattresses therein, is created by the processor and stored in the memory module. The indoor store map could also be used, by the processor, to represent a programmatic linking of the in-store positions of each of the mattresses, and to display an estimated time required to traverse between each of the mattresses displayed in-store. For instance, if there are four mattresses M1-M4, the processor triggers the indoor store map to display the positions of the four mattresses relative to one another, and the possible time taken to traverse between mattresses M1-M4 in every possible order. A programmatic linking of the processor generated customer ID and the combinations of mattress IDs and sensed pressure data emanating from the customer's subsequent mattress engagements/interactions is preferably based on an analysis of the time period pre-estimated to be necessary for the customer to traverse from the first mattress and through each of the subsequent mattresses. And in this manner, the system, method, and the computer program product envisaged by the present disclosure tracks and analyzes the mattress interactions of even those customers who may not have been actively engaged by either the store manager or store sales personnel, and may not have access to the progressive web application.

DETAILED DESCRIPTION

Figure 1:
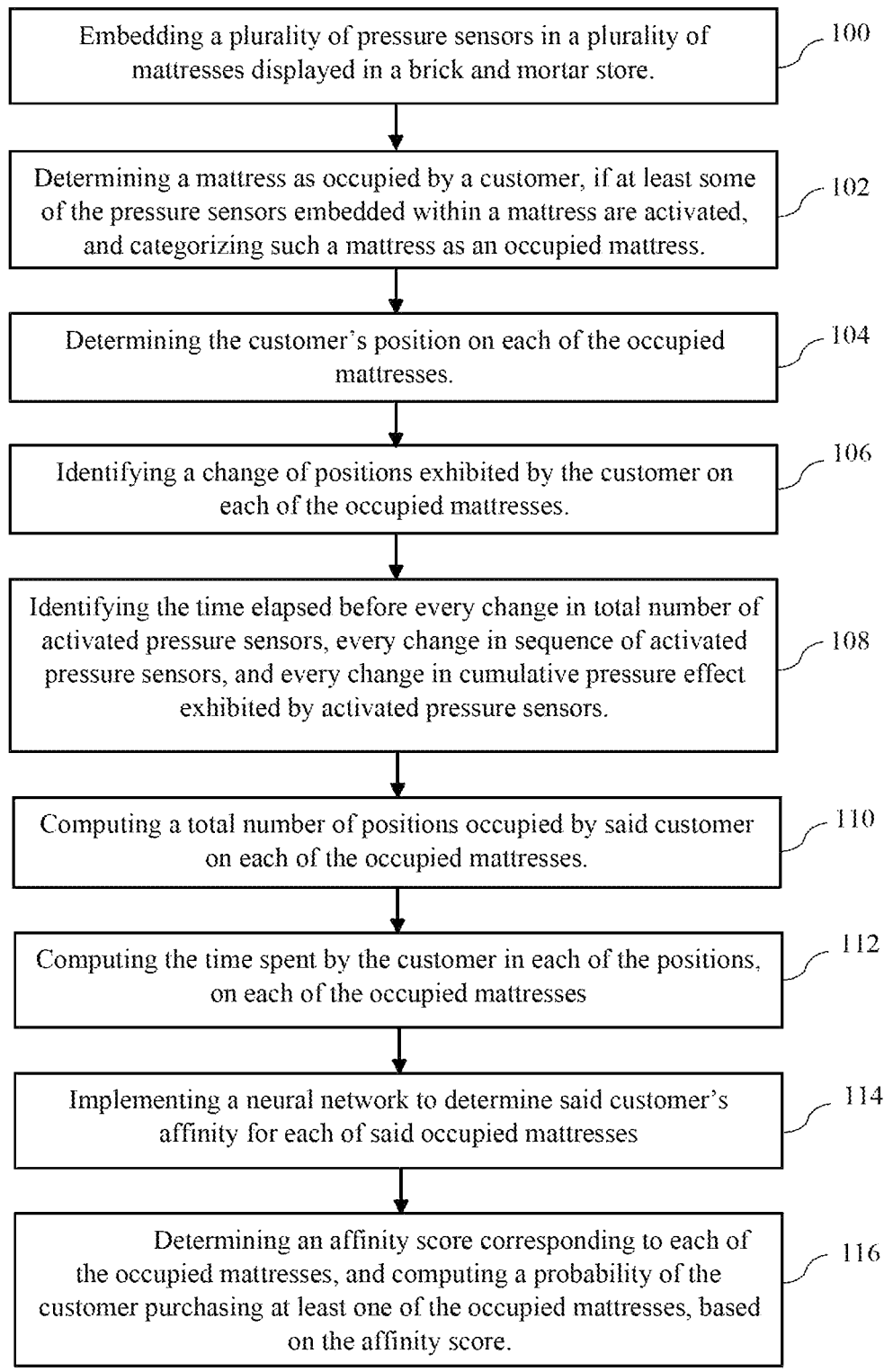
FIG. 1 is a flowchart illustrating the steps involved in the method for determining a customer's affinity towards a plurality of mattresses displayed in a brick and mortar store, and determining a probability of said customer purchasing at least one of said plurality of mattresses.

The present disclosure envisages a computer-implemented system, method, and computer program product for identifying customers' affinity towards mattresses displayed (for sale) in brick and mortar stores. The system, method and computer program product are directed particularly to brick and mortar stores selling mattresses (and optionally other allied items including bedsheets, pillows, pillow covers, and furniture such as sofas, recliners and the like), for such stores may not have been equipped, unlike online e-commerce platforms, with the technology (viz., software-driven technology as well as the hardware technology) necessary to track customer behavior and to deduce customer preferences and customer buying patterns therefrom. Throughout this document, the term 'brick and mortar stores' is used to refer to stores having a location, a physically identifiable infrastructure, and engaging in the business of selling mattresses (and other allied products including but not restricted to bedsheets and pillows) to the customers face-to-face. And throughout this document, the term 'online e-commerce platforms' refers to e-commerce platforms that facilitate, inter-alia, cataloging, viewing, purchasing, and reviewing of mattresses.

The system, method, and computer program product are specifically configured to track and subsequently identify the manner in which and the extent to which customers interact/engage with the mattresses displayed in brick and mortar stores: the extent of engagement/interaction determined based, inter-alia, on the time spent by the customers on each of the displayed mattresses, and the positions, viz, sleeping positions and sitting positions, taken up by the customers on each of the displayed mattresses. Also, certain web-based activities (including viewing mattress descriptions online, viewing mattress reviews online, liking and disliking mattress description pages, and the like) performed by the customers on pre-designated software applications (executable either on computers or handheld devices) and directed to any of the displayed mattresses are tracked to ascertain the extent of engagement/interaction of the customers.

The system, method and computer program product provide for customer interactions with mattresses displayed in brick and mortar stores to be minutely tracked and quantitively defined, notwithstanding that typical brick and mortar stores may not possess any means other than human intelligence—in the form of inputs from sales personnel and store managers, in addition to the customer feedback—to measure (and quantitively determine) customer interactions, and consequentially deduce customer behavior, customer preferences and customer buying patterns, unlike the online e-commerce platforms, which are typically driven by computer programs configured to track customer behavior minutely and to identify customer requirements and preferences based on a detailed programmatic analysis of the customer behavior. In essence, the system, method, and computer program product induce the analytical characteristics associated with computer programs into brick and mortar environments having little or no previous exposure to computer programs that track and analyze customer interactions, thereby enabling brick and mortar stores to emulate their online counterparts effectively, at least in terms of tracking and analyzing customers-mattresses interactions.

Given that it is common for customers to 'test' or 'engage' with the mattresses displayed in brick and mortar stores, to get acquainted with, inter-alia, levels of comfort on offer, sofiness, spinal alignment, compatibility with various sleeping postures, response to body pressure, the system, method, and computer program product envisaged by the present disclosure allows for such 'mattress tests' or 'mattress engagements' or' 'customer interaction with mattresses' to be electronically chronicled and analyzed-hitherto impossible in brick and mortar stores, for such stores were unlikely to possess electronic or software-driven means adapted to track mattress tests, analyze each of the mattress tests vis-à-vis their respective outcomes, and quantify the customer-mattresses interaction to deduce inferences relating to customer preference, behavior and buying patterns therefrom.

Further, while it is commonplace for online e-commerce platforms to minutely track customer interactions to infer customer behavior, preferences, and buying patterns, traditional brick and mortar stores, which typically possess no such facilities could employ the system, method and the computer program product envisaged by the present disclosure to track customer interactions, including mattress tests performed by customers, and to electronically chronicle the data defining the mattress tests, and to analyze the mattress test data and the corresponding mattress test results to not only understand customer preferences but also to determine, inter-alia, the sales conversion rates vis-à-vis each stock keeping unit (SKU), brand analysis—i.e., identification of mattress brands that receive most attention from the customers, product mix—i.e., mattress types that receive most attention from customers, store space utilization—i.e., optimal placement of mattresses drawing most attention from the customers.

As described earlier, the system, method and computer program product envisaged by the present disclosure allow for certain activities performed by customers on the World Wide Web as a part of accessing predetermined mattress selling platforms or on predetermined e-commerce applications rendering mattress available to customers for sale to be effectively tracked, with the data generated available from such tracking to be amalgamated with the mattress test data, to track customer interactions and thus infer customer behavior, preference and buying patterns, and also to carry out market research related activities including brand analysis, product mix analysis, sales conversion analysis, store space utilization calculation, and store space optimization among others. However, hitherto, brick and mortar stores were hard-pressed to ignore the computer-based or software-driven analysis of customer interactions and the ensuing identification of customer behavior, preferences and buying patterns, for the brick and mortar stores, as described earlier, relied solely on human intelligence (i.e., inputs from store managers, store managers, and customer feedback) to leverage their business model, contrary to the online e-commerce platforms which relied mainly upon software-based tools for optimizing and strategizing their business model.

One of the significant advantages associated with e-commerce platforms was that almost all the operations of e-commerce platforms (including, for example, the cataloging of products, listing of products, selling of products) were controlled and executed through an underlying software model (driven typically by computer-executable instructions). And therefore, extrapolating such a software model to incorporate the analytical principles necessary for the implementation of customer behavioral analysis and identification of customer preferences and buying patterns was comparatively a simpler task. But, in contrast, the brick and mortar stores found the same task to be monumental, for their business model was always independent of and thus was never integrated with a software model. The system, method, and computer program product envisaged by the present disclosure bridges the gap between online e-commerce platforms and brick and mortar stores, at least in terms of analysis of customer interactions and the ensuing identification of customer behavior, preferences and buying patterns. The system, method, and computer program product envisaged by the present disclosure enables brick and mortar stores also to track, electronically chronicle, and analyze customer interactions, and deduce customer behavior, preferences and buying patterns therefrom, while not relying solely upon human inputs (viz., inputs about customer behavior gathered from store managers and sales personnel), and by accommodating a purpose-built software-based analytics tool, seamlessly and straightforwardly, without having to modify the existing business model significantly.

One of the unique selling propositions (USP) of online e-commerce platforms was the ability to seamlessly track not only the purchases initiated by the customers but also the auxiliary activities performed by the customers either before purchasing a product or after buying a product, viz . . . repetitively accessing product pages, browsing through product histories, reviewing products, reading in detail about specific products, reviewing particular products, and liking or disliking certain products. The brick and mortar stores, given their business model and a resulting lack of exposure to the analytical software models integrated with online e-commerce platforms, were hitherto never exposed to the wealth of information derivable from tracking, chronicling, and analysis of such auxiliary activities. The system and method envisaged by the present disclosure also bridge the gap in the analysis of auxiliary activities, by enabling brick and mortar stores also to electronically track the auxiliary activities (for example, activities occurring before or after the purchase of a mattress) performed by customers, the absence of an online selling platform and an underlying software model notwithstanding, as long as the customers direct their auxiliary activities through a platform continually monitored by the system, method, and computer program product envisaged by the present disclosure.

In summary, the computer-implemented system, method, and computer program product bridges the gap between online e-commerce platforms and conventional brick and mortar stores, at least in terms of tracking and analyzing customer interactions and deducing customer behavior, preferences and buying patterns therefrom, by providing for the affinity exhibited by a customer towards the displayed mattresses to be identified, quantified, and analyzed. Also, the computer-implemented system, method, and computer program product provide for the probability of a customer buying any of the mattresses he has interacted with (ostensibly, in the form of mattress tests) to be forecasted with reasonable accuracy, based on systematic identification, tracking, chronicling and analysis of mattress tests and the ensuing mattress test results and a programmatic amalgamation of mattress test results with the web-activities related data extracted from the tracking of web-activities performed by the said customer in respect of any of the mattresses he has interacted with, in the form of mattress tests.

The computer-implemented method envisaged by the present disclosure is explained with the help of a flowchart that pictorially illustrates the steps involved in identifying a customer's affinity towards each of the mattresses displayed in a brick and mortar store, by way of tracking customer's interactions with each of the (displayed) mattresses-occurring through mattress tests performed by the customer or through web-based activities directed at each of the mattresses or both—and in processing the data corresponding to the customer's interactions with each of the displayed mattresses to compute corresponding affinity scores. The method also envisages analysis of the affinity scores attributed to each of the displayed mattresses, for computation of the probability of the customer purchasing any of the displayed mattresses.

While the method envisaged by the present disclosure is configured to be executed/implemented simultaneously at a multitude of brick and mortar stores, to determine multiple customers' affinity towards the variety of mattresses displayed therein, for the sake of brevity and explanation, we are considering, as an example, a sole brick and mortar store having one customer (202A in FIG. 2) arriving at the brick and mortar store at a particular point in time to interact/engage with the mattresses displayed therein—by way of mattress tests or by way of web-based activities directed at the displayed mattresses or both—and to contemplate the selection of at least one of the mattresses, based on his interaction with the displayed mattresses. Throughout the remainder of the present disclosure, the term 'brick and mortar store' is substituted by the term 'store' for the sake of brevity, with both the terms implying the same characteristics and definition.

In accordance with the present disclosure, the mattress tests performed by the customer 202A—the mattress tests indicative of the interaction between the customer 202A and the mattresses-on the mattresses displayed within the store are typically prioritized over any web-based activities performed by the customer in respect of the displayed mattresses, for the mattress tests are considered as symbolizing a far more detailed, elaborate, personalized, and assertive interaction between the customer 202A and the displayed mattresses vis-à-vis the web-based activities-including but not restricted to scanning the barcodes affixed onto the displayed mattresses, viewing of reviews (ostensibly by other customers) corresponding to displayed mattresses, accessing, liking and disliking web pages describing the displayed mattresses, marking as favorite the web pages describing the displayed mattresses, and viewing of product description videos corresponding to the displayed mattresses.

Figure 3:
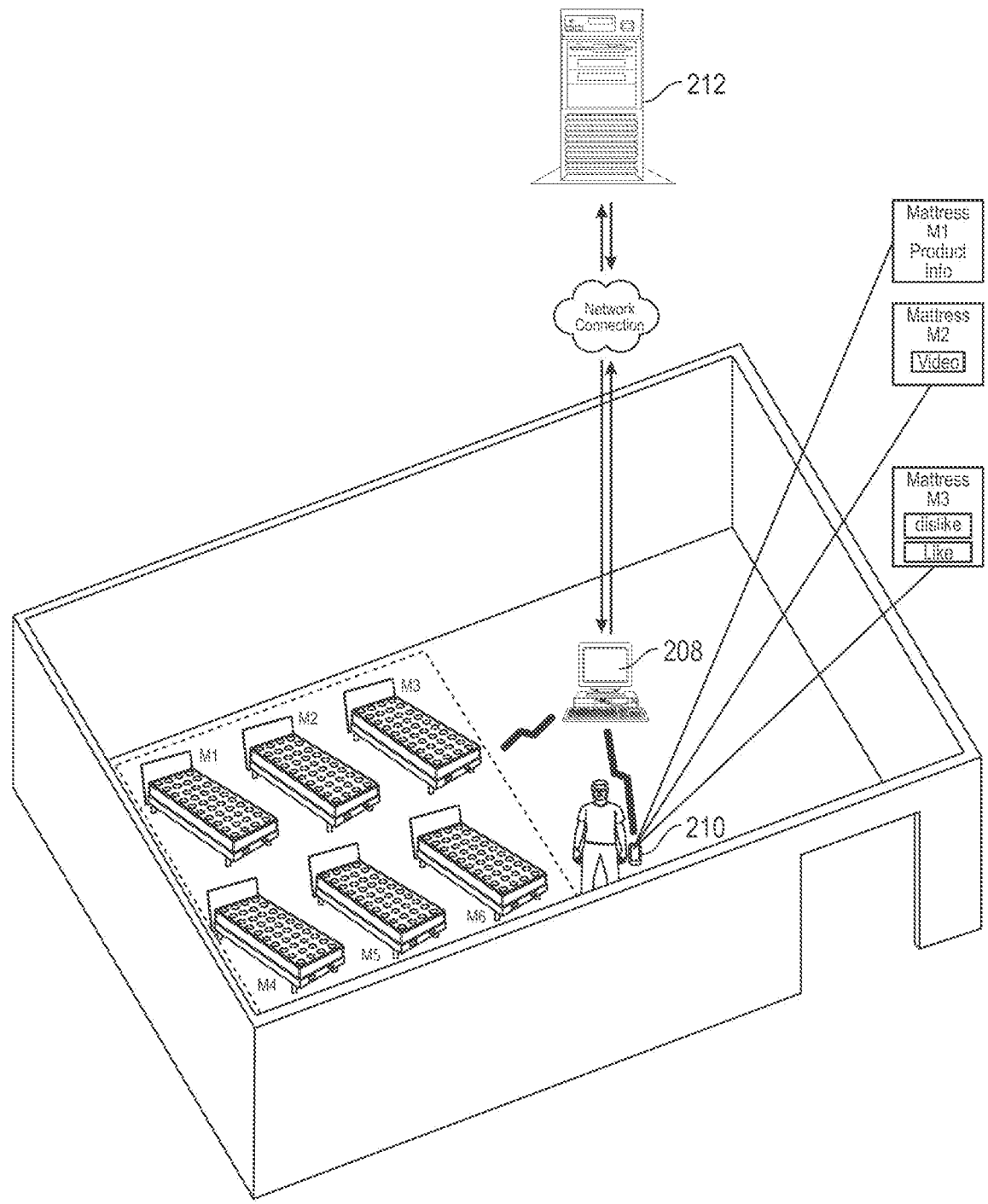
FIG. 3 is a block diagram illustrating the brick and mortar store and the arrangement of the system envisaged by the present disclosure within the brick and mortar store.
Figure 4:
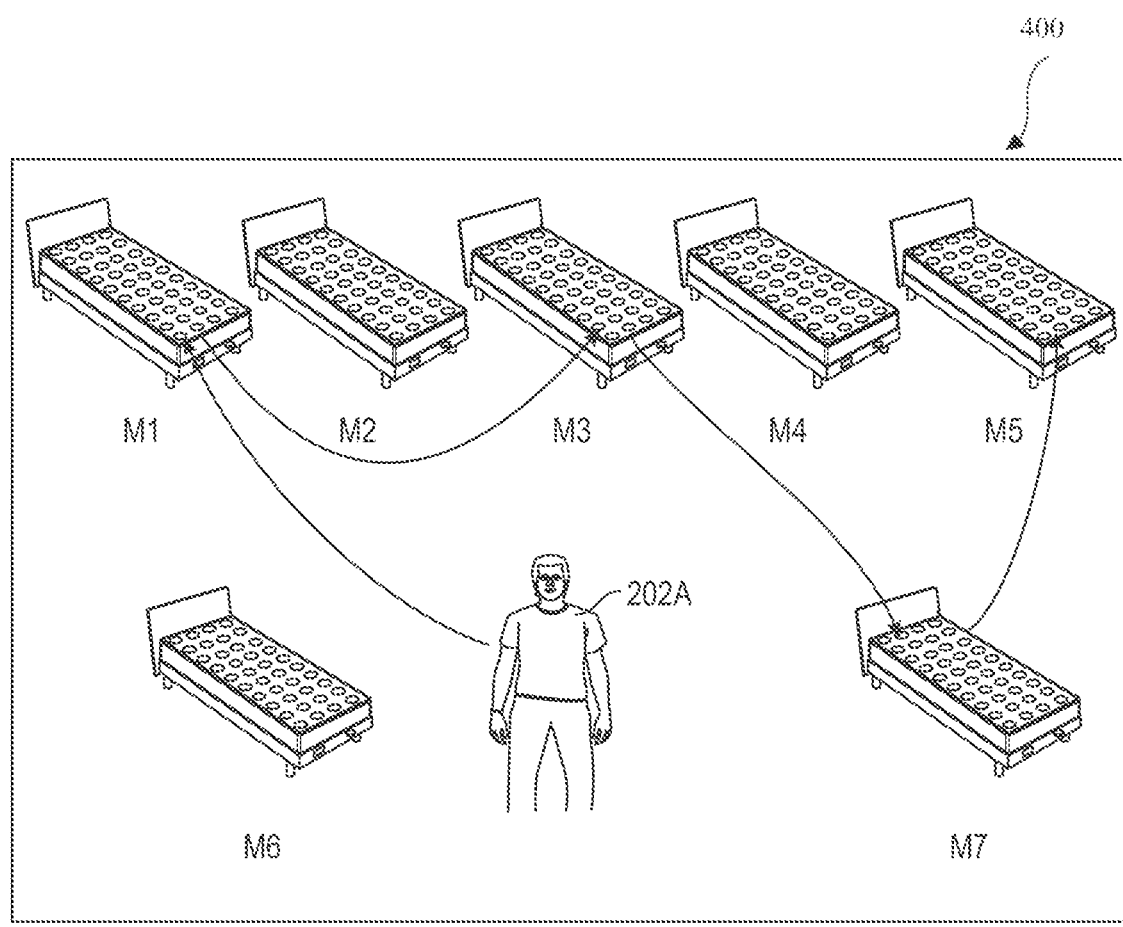
FIG. 4 is a diagram illustrating an indoor store map and a virtual customer pathway generated by the computer-implemented system, method, and computer program product of the present disclosure.

In accordance with the present disclosure, an indoor store map (400 in FIG. 4) representative of the store layout, as well as the positioning of each of the mattresses displayed in the store, is created. The indoor store map 400 is created, preferably in an electronic format. The indoor store map 400 may not be on-scale with the dimensions of the store, but accurately represents the positioning of each of the mattresses as illustrated in FIG. 4. The indoor store map 400 is preferably stored on a computer-based device (208 in FIG. 3) located within the premises of the store and pre-configured to execute the method and the computer program product envisaged by the present disclosure. The computer-based device 208 incorporates at least one processor, at least one memory module, and a user interface, with the processor, the memory module, and the user interface communicably coupled to one another. Preferably, the computer-based device is rendered accessible, via the user interface, to the employees of the store, including the store manager and sales personnel employed in the store. Preferably, the indoor store map 400 is stored on the memory module of the computer-based device 208 and is rendered accessible (to the employees of the store) via the user interface. The indoor store map 400, which may have been available in paper format, may also be converted into a digital format using well-known digital floor mapping techniques (the description of which has been omitted given their well-known nature and for the sake of brevity) before being stored on the memory module. Alternatively, it is possible that soon after the mattresses are positioned across the store, a digital version of the store map 400 is created using well-known digital floor mapping techniques, whose explanation has been skipped for the sake of brevity.

Essentially, the computer-based device 208 may be at least one of a desktop computer or a laptop computer or a tablet device. Further, it is also possible that the computer-based device 208 is a standalone device embodying, in the form of the processor, the processing capabilities necessary to, inter-alia, create the indoor store map 400, and execute the method and the computer program product envisaged by the present disclosure. Alternatively, the computer-based device 208 may be communicably coupled to a remote server (212 in FIG. 3) having the processing capabilities to create (inter-alia) the indoor store map 400, based on the mattress-positioning data possibly received from the computer-based device 208 located within the store, and execute the method and the computer program product envisaged by the present disclosure, in communication with the computer-based device 208. Typically, the computer-based device 208 communicates with the remote server 212, for example, using a client-server communication model, to trigger the remote server 212 to create the indoor store map 400, and to execute the computer-implemented method and the computer program product envisaged by the present disclosure. However, regardless of the procedure and the hardware used for the creation of the indoor store map 400, the indoor store map 400 incorporating details of the positioning of each of the mattresses across the store is rendered accessible on the computer-based device 208 located on-store.

Figure 2:
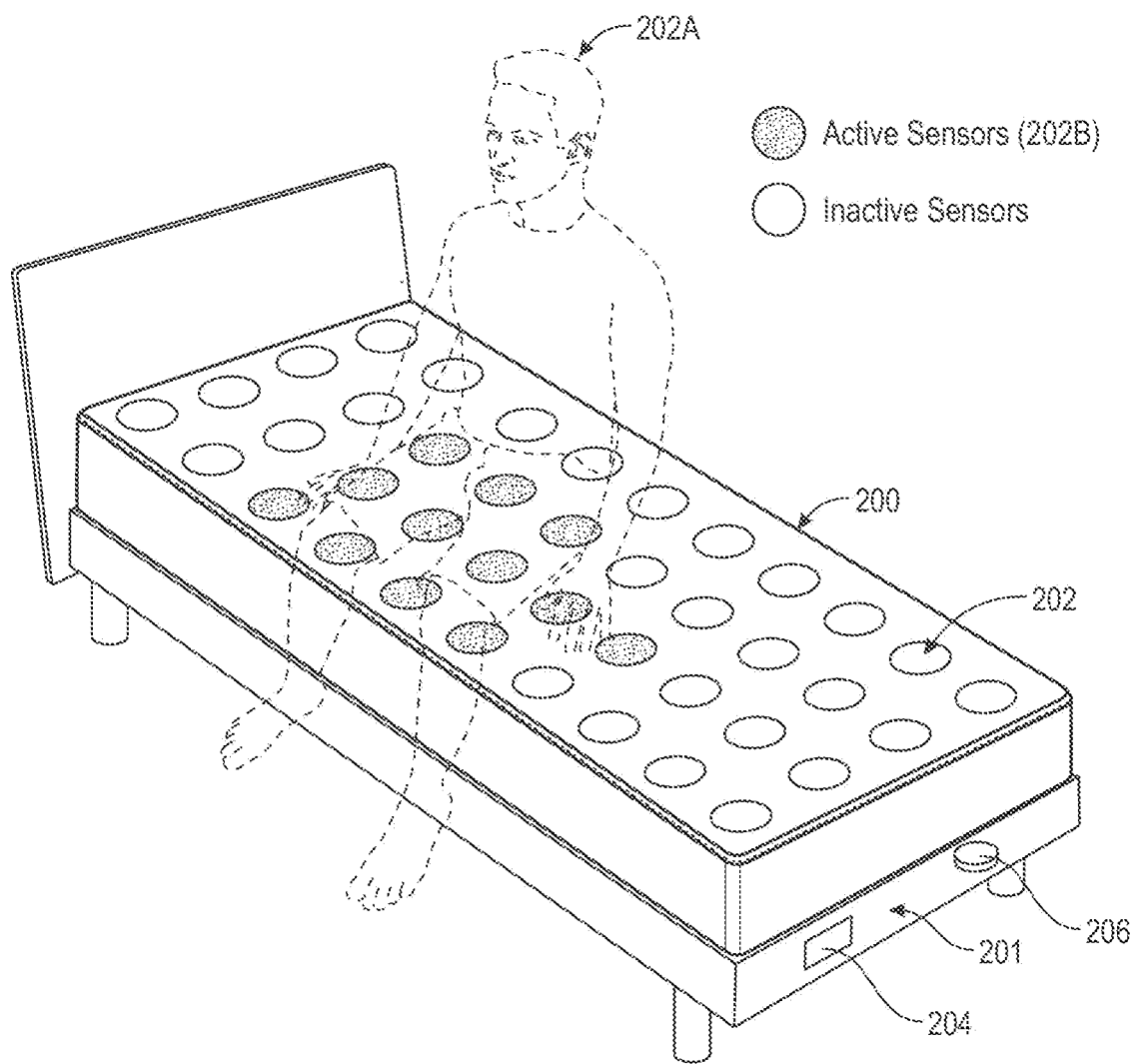
FIG. 2 is a diagram illustrating a customer occupying a sitting position on a mattress offered for sale at a brick and mortar store.

The execution of the method envisaged by the present disclosure begins with the implementation of step 100, at which every mattress positioned (placed) within the premises of the store is embedded with a plurality of pressure sensors (202 in FIG. 2). Subsequently, each of the mattresses positioned within the store is assigned a unique mattress identifier (mattress ID), usable, ostensibly, for uniquely identifying each of the mattresses. Likewise, every pressure sensor embedded in each of the mattresses displayed in-store is rendered uniquely identifiable by way of assignment of unique sensor identifiers (sensor IDs). For instance, if 'forty' pressure sensors (collectively referenced by reference numeral 202) were embedded within a particular mattress, then each of the sensors would be serially assigned sensor IDs S1-S40. While it is possible that a store would incorporate a multitude of mattresses and each mattress could accommodate a multitude of pressure sensors (often depending upon the dimensions of the mattresses), for the sake of explanation, 'four' mattresses have been considered as displayed in the store. And each of the four mattresses is considered as incorporating 'forty' pressure sensors 202, respectively. Preferably, the 'four' mattresses are assigned mattress IDs 'M1' 'M2,' 'M3,' and 'M4,' respectively. And as described above, mattresses M1-M4 incorporate sensors S1-S40, respectively.

Preferably, each mattress located in-store (mattress ID: M1-M4) is placed on a corresponding bed base (201). And preferably, each bed base (201 in FIG. 2) is embedded with the plurality of pressure sensors 202 in such a way that the pressure sensors 202 are able to accurately sense the pressure applied upon the mattress placed on the bed base 201. In accordance with the present disclosure, the expression 'pressure sensors 202 embedded within the mattress' is to be construed as referring to the phenomenon of the pressure sensors 202 placed between the mattress and the underlying bed base 201 (or box spring), such that they (the pressure sensors 202) are responsive to the pressure applied upon the mattresses positioned there above. And in certain sections of the present disclosure, while the pressure sensors 202 bave been explained as embedded within the mattresses, such an explanation should be construed, given the operational constraints associated with the handling of mattresses, in a sense broad enough to incorporate embedding of the pressure sensors 202 in between the mattresses and the underlying bed base 201 (or the box spring). And therefore, the pressure sensors 202 (sensor IDs: S1-S40) are considered to be embedded between each of the four mattresses (mattress ID: M1-M4) and the corresponding bed bases 201 (or box springs).

In accordance with the present disclosure, each mattress (mattress ID: M1-M4) is associated with (or embedded with) a corresponding microcontroller (204 in FIG. 2) and a wireless beacon (206 in FIG. 2: beacon ID: B1-B4), in addition to the plurality of pressure sensors 202 (sensor ID: S1-S40), Further, it is possible that the microcontrollers 204 and the beacons 206 are embedded either within each of the mattresses (M1-M4) or the corresponding bed bases 201. But in the drawings, for the sake of explanation, the microcontroller 204 and the wireless beacon 206 are embedded within the bed bases 201 incorporating the mattresses M1-M4. Essentially, the function of each of the microcontrollers 204 associated with the respective mattresses is to amalgamate the pressure data obtained from the respective pressure sensors 202 (sensed pressure data), programmatically link the pressure data to the corresponding mattress ID, and transmit the combination of the pressure data and the mattress ID (thereby identifying the mattress on which the pressure readings-sensed pressure data-were observed) to the computer-based device 208 for further analysis. The wireless beacons 206 are used to track the location of the customer 202A in FIG. 2 (sole customer, in this example case) as well as a salesperson (lone salesperson, in this example case) and any changes thereof vis-à-vis the positioning of the mattresses M1-M4. The wireless beacon 206 embedded within each mattress (M1-M4) is configured to emit a unique identifier in the form of a wireless signal. Preferably, the wireless beacon 206 is pre-programmed to emit the mattress ID of the mattress with which it is embedded, as the unique identifier, for each mattress is uniquely represented through the corresponding mattress ID. For instance, the beacon (B1) embedded with the mattress having been assigned with mattress ID 'M1,' emits 'M1' as the unique identifier, in the form of a wireless signal.

In contrast, the beacon (B2) associated with the mattress having been assigned with mattress ID 'M2,' emits 'M2' as the unique identifier, in the form of a wireless signal. The same principle is extrapolated for beacons 'B3' and 'B4', Preferably, the microcontrollers 204 associated with the mattresses M1-M4 are pre-programmed to recognize the corresponding mattress IDs (i.e., M1-M4) and to be aware of the phenomenon of beacons 206 installed within mattresses M1-M4 emitting the corresponding mattress IDs (i.e., M1-M4) as unique identifiers.

In accordance with a preferred embodiment of the present disclosure, the customer 202A intending to visit the store and engage/interact with a plurality of mattresses displayed therein, and thereby test the said mattresses, is mandated to install a predetermined 'mattress shopping application' responsive to the unique identifiers emitted by the beacons B1-B4, and that enables the customer 202A, to perform a plurality of web-based activities relevant to mattress shopping, including but not restricted to scanning the barcodes affixed on the mattresses, viewing of reviews corresponding to mattresses, accessing, liking and disliking web pages describing the mattresses, marking as favorite the web pages describing certain mattresses, and viewing of product description videos corresponding to certain mattresses. Preferably, when the customer downloads and installs the mattress shopping application onto his handheld device (210 in FIG. 3), which could either be a smartphone or a tablet device, he is automatically assigned a unique customer ID.

Likewise, every salesperson (not shown in figures) employed within the store is assigned a tablet device (not shown in figures), which, in turn, is installed with a native retail application authorized to be programmatically executed to (inter-alta) record customer demographic data and customer preferences, display to the customer the catalog of mattresses and allied products, and demonstrate to the customer the information about the mattresses offered on sale. Typically, when the native retail application is installed on the tablet device rendered accessible to a salesperson, the native retail application generates a unique salesperson ID and assigns the thus generated unique salesperson ID to the salesperson operating the tablet device. In line with the mattress shopping application installed within the customer's handheld device 210, the native retail application installed within the salesperson's tablet device is also responsive to the unique identifiers emitted by the beacons (B1-B4) in the form of wireless signals.

In accordance with the preferred embodiment of the present disclosure, the mattress shopping application and the native retail application wirelessly receive the unique identifiers emitted from the beacons (B1-B4) installed within the mattresses (M1-M4). Subsequently, mattress shopping application and the native retail application process the unique identifiers transmitted from the beacons B1-B4, and based on a signal strength associated with the received unique identifiers, calculate the proximity, i.e., the physical distance between the mattresses M1-M4 and the customer's handheld device 210, and the mattresses M1-M4 and the salesperson's tablet device respectively. Alternatively, the mattress shopping application could be pre-programmed to transmit a data packet (a pseudorandom number) to the beacons (B1-B4) installed within the mattresses M1-M4, and estimate a distance between the customer's handheld device 210 (executing the mattress shopping application) based on the total time elapsed before a reply is received from the beacons B1-B4, in response to the transmitted data packet. And likewise, the native retail application could also be pre-programmed to transmit a data packet (a pseudorandom number) to the beacons (B1-B4) installed within the mattresses M1-M4, and estimate a distance between the salesperson's tablet device (executing the native retail application) based on the total time elapsed before a reply is received from the beacons B1-B4, in response to the transmitted data packet.

In accordance with the preferred embodiment of the present disclosure, when the mattress shopping application installed within the customer's handheld device 210 detects that the customer's handheld device 210 is in close proximity to, for example, the mattress identified by mattress ID M1, the mattress shopping application further determines if the physical distance between the customer's handheld device 210 and the mattress identified by mattress ID M1 is less than a pre-determined threshold value (for example, one meter). If the physical distance between the customer's handheld device 210 and the mattress identified by mattress ID M1 is indeed less than the predetermined threshold value, then the mattress shopping application programmatically associates the mattress identified by mattress ID M1 with the customer 202A (whose handheld device 210 is executing the mattress shopping application) and interlinks the unique customer ID (associated with the customer 202A whose handheld device 210 is executing the mattress shopping application) and the unique mattress ID (of the mattress determined to be in proximity to the customer's handheld device 210; and in this case the mattress ID is M1), and transmits the interlinked mattress ID and customer ID (i.e., M1 and C1) to the processor installed within the computer-based device 208 that in turn, triggers the storage of the interlinked mattress ID and customer ID on the memory module installed thereon.

Likewise, when the native retail application installed within the salesperson's tablet device detects that the salesperson's tablet device is in close proximity to, for example, the mattress identified by mattress ID M1, the native retail application further determines if the physical distance between the salesperson's tablet device and the mattress identified by mattress ID M1 is less than a pre-determined threshold value (for example, one meter). If the physical distance between the salesperson's tablet device and the mattress identified by mattress ID M1 is indeed less than the predetermined threshold value, then the native retail application programmatically associates the mattress identified by mattress ID M1 with the salesperson (whose tablet device is executing the native retail application) and interlinks the unique salesperson ID (associated with the salesperson whose tablet device is executing the native retail application) and the unique mattress ID (of the mattress which is determined to be in proximity to the salesperson's tablet device; and in this case the mattress ID is M1) and transmits the interlinked mattress ID and salesperson ID (i.e., M1 and SP1) to the processor installed within the computer-based device 208 that in turn, triggers the storage of the interlinked mattress ID and salesperson ID on the memory module. And in this manner, the proximity between the customer 202A and the mattresses (M1-M4) and the salesperson and mattresses M1-M4 is determined in real-time. The identification of the proximity between the customer 202A and any of the mattresses M1-M4 would also act as an indicator of the likelihood that the customer 202A would test/engage with any of the mattresses M1-M4, by initially occupying either a sitting position or a sleeping position thereon. The identification of the proximity between the salesperson and any of the mattresses M1-M4 would enable identification of the (real-time) relative distance (or proximity) between the customer and the salesperson at a given point in time, vis-à-vis mattresses M1-M4, and also allows for hypothesizing of customer-salesperson interactions.

Figure 2A:
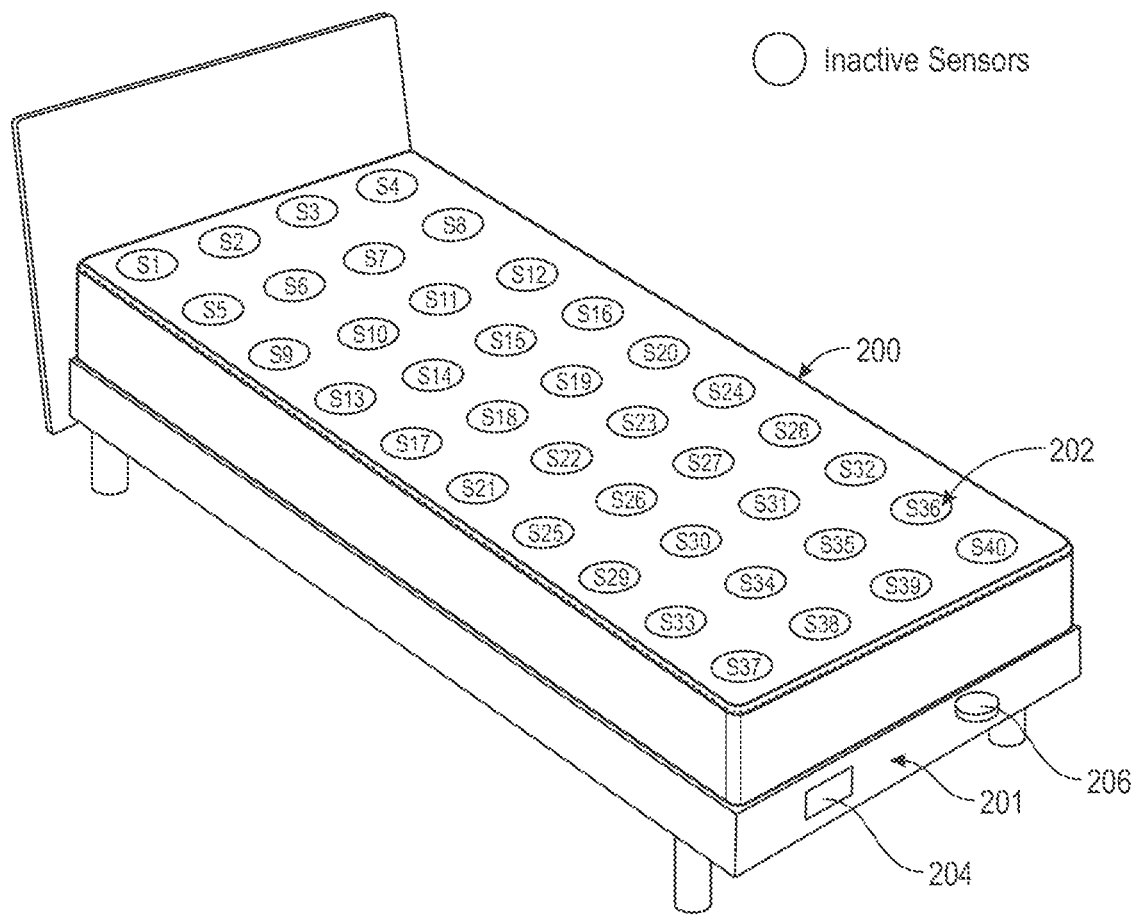
FIG. 2A is a diagram illustrating the arrangement of pressure sensors on a mattress offered for sale at a brick and mortar store.

FIG. 2 illustrates the customer 202A and only one mattress 200 (mattress ID: M1) amongst the four mattresses (M1-M4) displayed in-store. For the sake of brevity, the features envisaged by the computer-implemented method of the present disclosure are illustrated, taking into consideration the lone customer 202A, the mattress 200 (mattress ID: M1), and a lone salesperson (not shown in figures). As shown in FIG. 2, a plurality of pressure sensors 202 (sensor IDs: S1-S40) are embedded within the mattress 200. Preferably, the pressure sensors (S1-S40) 202 are clustered to form an ordered grid as illustrated in FIG. 2A. Referring again to FIG. 2, the pressure sensors 202 are positioned such that they cover the mattress 200 in entirety, and such that pressure applied upon any area of the mattress 200 is accurately and timely sensed by the pressure sensors 202. As explained above, every sensor (each of the 'forty' sensors in this example case) embedded within the mattress 200 is uniquely identifiable via the corresponding sensor ID (S1-S40).

In accordance with the present disclosure, the reason behind embedding pressure sensors 202 within the mattress 200 is to detect, by sensing the body pressure applied thereupon (ostensibly by the customer 202A), the phenomenon of the customer 202A occupying a position on the mattress 200. In accordance with the present disclosure, a 'mattress test' that symbolizes the customer's (202A) interaction/engagement with mattress 200 begins with the customer 202A occupying a position on the mattress 200. Essentially, the moment the customer 202A enters the store, he is instructed to activate the pre-determined mattress shopping application installed on his handheld device 210, thereby allowing for his in-store movements to be chronicled and analyzed. Ideally, such instructions are pushed in the form of a notification to the customer's (202A) handheld device 210 as soon as a primary beacon (or a traffic counter) positioned at the storefront (not shown in figures, and ostensibly different from the beacons B1-B4 embedded within mattresses M1-M4) detects, using location mapping techniques explained in the above paragraphs, that the customer 202A has entered the store (or that the customer 202A is about to enter the store). As explained earlier, the mattress shopping application installed on the customer's handheld device 210 associates a customer ID (C1) with the customer 202A. And the moment customer 202A enters the store and activates the mattress shopping application installed on his handheld device 210, the customer ID (i.e., C1) is wirelessly transmitted from the customer's handheld device 210 to the computer-based device 208 located within the premises of the store, and in particular to the processor installed within the computer-based device 208. The processor subsequently triggers the memory module to store the customer ID C1, and simultaneously begins waiting for the microcontrollers 204 associated with mattresses M1-M4 to transmit any sensed pressure data attributable to the customer ID C1.

In accordance with the present disclosure, the presence of the customer 202A on the mattress 200 is detected, at least in part, based on the activation of at least some of the pressure sensors 202 underlying the mattress 200. As explained earlier, when the customer 202A approaches the mattress 200 (mattress ID: M1) with his mattress shopping application activated, the activated mattress shopping application receives the unique identifier (M1) transmitted by the beacon (B1) associated with (or embedded with) mattress 200. Accordingly, the mattress shopping application calculates if the customer 202A (C1) and the mattress 200 (M1) are within a one-meter distance (from one another). And, if the customer 202A (C1) and the mattress 200 (M1) are determined to be within a one-meter distance (predetermined threshold value) from one another, then the mattress shopping application transmits the interlinked customer ID (C1) and the mattress ID (M1) to the processor installed within the computer-based device that, in turn, stores the interlinked customer ID (C1) and mattress ID (M1) in the memory module.

The table (Table 1) provided below illustrates the format in which the interlinked customer ID C1 and mattress ID M1—the interlinking achieved based on the inference drawn by the mattress shopping application and beacon B1 associated with mattress 200 (M1).

| Customer ID | Mattress ID | Sensed Pressure Data |
|---|---|---|
| C1 | M1 | Awaited |

And when the customer 202A proceeds to occupy a position on mattress 200 (M1), activating at least some of the pressure sensors 202 in the process, the inference generated by the mattress shopping application that customer 202A (C1) is in close proximity to mattress 200 (M1) is reinforced. And the sensed pressure data transmitted from the microcontroller 204 associated with mattress 200 is stored in the memory module, against the pre-stored interlinked customer ID (C1) and mattress ID (M1), as shown in Table 2.

When the customer 202A proceeds to occupy a position on the mattress 200, after being detected by the combination of the beacon (B1) and the mattress shopping application as being in close proximity to mattress 200 (M1), the pressure sensors 202 positioned directly below the portion of the mattress 200 on which the customer 202A is either sitting or has exhibited a sleeping position are activated (due to the application of the body pressure thereon). The activated pressure sensors are collectively represented using the reference numeral 202B. And upon activation, the (activated) pressure sensors 202B trigger the microcontroller 204 embedded within the mattress 200, which in turn, processes the signals received from the activated pressure sensors 202B and determines the cumulative pressure exhibited by the activated pressure sensors 202B. Further, the microcontroller 204 embedded within the mattress 200 connects, preferably wirelessly, to the computer-based device 208 located within the premises of the store, and transmits the sensed pressure data (derived from the activated pressure sensors 202B) along with the mattress ID (in this case, the mattress ID is M1, for the sensed pressure data is obtained from mattress 200 identified by mattress ID M1) to the processor embedded within the computer-based device 208. Preferably, the sensed pressure data received by the processor for mattress 200 (M1) is stored in the memory module, against the pre-stored interlinked customer ID (C1) and mattress ID (M1) as illustrated in Table 2.

Preferably, after being detected by the combination of the beacon (B1) and the mattress shopping application as being in close proximity to mattress 200 (M1), the customer 202A is required to occupy a position on the mattress 200 before a predetermined time limit is elapsed, so that the customer 202A is positively and unambiguously identified as having been in proximity to mattress 200 and also as having tested (having occupied a position on) the mattress 200—based on the mattress ID M1 of mattress 200 being the common factor in both the inference from the beacon (B1) and the mattress shopping application, and the sensed pressure data. In accordance with the present disclosure, only if the customer 202A is positively and unambiguously identified as having been in proximity to mattress 200 and also as having tested the mattress 200, the sensed pressure data received by the processor for mattress 200 is stored in the memory module, programmatically joined to the pre-stored interlinked customer ID (C1) and mattress ID (M1).

The table (Table 2) provided below illustrates how the sensed pressure data (derived from the mattress test—i.e., customer 202A occupying a position on the mattress 200) is p interlinked with the pre-stored interlinked customer ID and mattress ID (the interlinking having been performed, as explained above, based on the inference drawn by the mattress shopping application and beacon B1.

| | | | Sensed Pressure Data | | | |
|---|---|---|---|---|---|---|
| Customer ID | Mattress ID | Activated Sensor ID | Sensed Pressure | Activated Pressure Sensor Sequence | Cumulative Pressure Effect (Pascal) | Total Activated Pressure Sensors |
| C1 | M1 | S4 | 717 | S4, S8, S11, | 1984 | 3 |
| | | S8 | 873 | | | |
| | | S11 | 394 | | | |

Step 102 is repeated for all the remaining mattresses located within the store (i.e., mattresses referenced by mattress IDs M2-M4) and the processor (installed within the computer-based device 208) receives the sensed pressure data from the microcontrollers 204 embedded within each of the mattresses (i.e., mattresses referenced by mattress IDs M2-M4) tested by the customer 202A (customer ID: C1). Based on the received sensed pressure data, the processor identifies, amongst the remaining mattresses located within the store (M2-M4), the mattresses which have occupied at least once by the customer 202A. The processor generates a listing of the mattresses occupied by the customer 202A (C1) along with the corresponding mattress IDs and the corresponding sensed pressure data. Further, the processor programmatically joins the combination of the mattress IDs (M1-M4; indicative of the mattresses tested by the customer 202A), and the corresponding sensed pressure data to the customer ID C1, as shown below in Table 3.

| Customer ID | Mattress ID | Sensed Pressure Data |
|---|---|---|
| C1 | M1 | Sensed pressure data from microcontroller 204 associated with mattress 1 |
| | M2 | Sensed pressure data from microcontroller 204 associated with mattress 2 |
| | M3 | Sensed pressure data from microcontroller 204 associated with mattress 3 |
| | M4 | Sensed pressure data from microcontroller 204 associated with mattress 4 |

In accordance with the present disclosure, the customer ID is used as a unique pointer, with reference to which the data indicative of the mattresses tested by the user (i.e., mattress IDs) and sensed pressure data received from each of the mattresses tested by the user are electronically chronicled. And, as illustrated in the above table, if the customer 202A, identified by customer ID C1, tests multiple mattresses, i.e., mattresses identified by mattress IDs M1, M2, M3, and M4, then each of the mattress IDs is firstly linked to the customer ID C1, followed by linking of the sensed pressure data obtained from each of the mattresses identified by mattress IDs M1, M2, M3, and M4, to the customer ID C1. As explained in the above paragraphs, at step 102, the mattresses occupied at least once by the customer 202A are identified, based on the tracking of activation of at least some of the pressure sensors 202 embedded within each of the mattresses, and the mattresses deemed to be occupied at least once by the customer 202A are designated as 'occupied mattresses.' The memory module, as described above, stores in an interlinked manner the customer ID C1 (indicative of the customer 202A who tested the mattresses identified by mattress IDs M1, M2, M3, and M4), the mattress IDs (M1, M2, M3, and M4) and the sensed pressure data (derived from the mattresses identified by mattress IDs M1, M2, M3, and M4), as illustrated in Table 3. In accordance with the present disclosure, at the beginning of step 104, for the sake of brevity and explanation, only mattress 200 having mattress ID M1 is considered to be occupied by customer 202A (customer ID: C1), even though there exists a possibility that the customer 202A (C1) could have occupied mattresses identified by mattress IDs M2, M3, and M4, in addition to M1. Step 104 involves the identification of the customer's (202A) first position on mattress 200 (M1). Essentially, the first position taken up by the customer 202A on mattress 200 is determined based at least on the sequence of activated pressure sensors 202B, a total number of activated pressure sensors 202B, and cumulative pressure effect exhibited by the activated pressure sensors 202B.

As discussed earlier, FIG. 2 illustrates the customer 202A as occupying a sitting position on the mattress 200. Furtherance to the customer 202A occupying the said sitting position, at least some of the pressure sensors 202 located beneath the customer's position are activated, as shown in FIG. 2. As discussed earlier, in FIG. 2, reference numeral 202 denotes the pressure sensors embedded within the mattress 200, and the reference 202B denotes the activated pressure sensors. Essentially, the moment the customer 202A sits on the mattress 200, the pressure sensors 202 located directly below the customer's sitting position are activated. The activated pressure sensors 202B consequentially sense the amount of pressure individually applied thereupon and subsequently trigger the microcontroller 204 embedded within the mattress 200. The microcontroller 204, on its part, receives the sensed pressure data from each of the activated pressure sensors 202B and determines, based on a programmatic analysis of the sensed pressure data, the total number of activated pressure sensors 202B, the sequence of the activated pressure sensors 202B, and the cumulative pressure effect exhibited by the activated pressure sensors 202B (i.e., a total of the pressure sensed by the activated pressure sensors 202B). The term 'sensed pressure data,' as explained above, constitutes the total number of pressure sensors activated when the customer 202A takes up a position on the mattress 200, the sensor IDs corresponding to the activated pressure sensors 202B, the pressure value sensed by each of the activated pressure sensors, the sequence of the activated pressure sensors 202B, and the cumulative pressure effect exhibited by the activated pressure sensors 202B.

In accordance with the present disclosure, the microcontroller 204 subsequently transmits the 'sensed pressure data,' to the processor (installed within the computer-based device 208) along with the mattress ID M1 assigned to the mattress 200. And, the said information received at the processor is stored in the memory module (installed within the computer-based device 208) against the mattress ID M1 assigned to the mattress 200 and the customer ID C1 assigned to the customer 202A, since it has been unambiguously and positively established at the end of execution of step 102 that the customer 202A (customer ID: C1) was in close proximity to the mattress 200 (mattress ID: M1) and has indeed tested/engaged with the mattress 200.

In accordance with the present disclosure, since step 104 involves determining the first position taken up by the customer 202A on the mattress 200, the processor analyzes the 'sensed pressure data' received from the microcontroller 204 associated with the mattress 200, including the total number of pressure sensors activated (202B) when the customer 202A takes up a position on mattress 200, the sensor IDs corresponding to the activated pressure sensors 202B, the pressure value sensed by each of the activated pressure sensors, the sequence of the activated pressure sensors 202B, and the cumulative pressure effect exhibited by the activated pressure sensors 202B.

The processor subsequently compares the total number of activated pressure sensors 202B and the cumulative pressure effect exhibited by the activated pressure sensors 202B to the first set of threshold values indicative of a sitting position, and the second set of values indicative of a sleeping position. For example, the first set of threshold values indicative of a sitting position could be programmatically fixed at '10' and '3500' for the total number of activated pressure sensors (202B) and cumulative pressure effect exhibited by the activated pressure sensors (202B) respectively. In contrast, the second set of threshold values indicative of a sleeping position could be programmatically fixed at '25' and '6000 Pascal' for a total number of activated pressure sensors (202B) and cumulative pressure effect exhibited by the activated pressure sensors (202B) respectively. And, when the customer 202A takes up a position on the mattress 200, if the total number of activated sensors 202B is 'seven' and if the cumulative pressure effect (in Pascal) is 2831, then the processor categorizes the customer's position as a sitting position, for the values '7,' and '2381' are numerically proximate to the first set of threshold values indicative of a sitting position ('10', '3500 Pascal') than to the second set of threshold values indicative of a sleeping position ('25', '6000 Pascal'). Step 104 is repeated for all the remaining mattresses located within the store (i.e., mattress referenced by mattress IDs M2-M4) and the processor (installed within the computer-based device 208) receives the sensed pressure data from the microcontrollers 204 embedded within each of the mattresses (M2-M4) tested by the customer 202A. Based on the received sensed pressure data, the processor identifies, for each of the mattresses (M2-M4), the position—the first position-taken up thereon by the customer 202A. If the customer 202A has interacted with, i.e., tested, all the four mattresses, and has taken at least one position (i.e., at least one sitting position or sleeping position) on all the four mattresses (mattress ID: M1-M4), the processor lists mattresses identified by mattress IDs M1-M4 as being occupied by the customer 202A (customer ID: C1), along with the total number of activated sensors 202B on mattresses M1-M4, cumulative pressure effect exhibited by the activated pressure sensors 202B on mattresses M1-M4, and the first position taken up by the customer 202B on mattresses M1-M4. Further, the processor programmatically joins the combination of the mattress IDs (M1-M4; indicative of the mattresses tested by the customer 202A) and the total number of activated sensors 202B on mattresses M1-M4, cumulative pressure effect exhibited by the activated pressure sensors 202B on mattresses M1-M4, and the first position taken up by the customer 202B on mattresses M1-M4, to the customer ID C1, as shown in Table 4.

| Customer ID | Mattress ID | Activated Pressure Sensors (Total) | Cumulative Pressure Effect (Pascal) | Customer's First Position |
|---|---|---|---|---|
| C1 | M1 | 7 | 2500 | Sitting Position |
|  | M2 | 19 | 5278 | Sleeping Position |
|  | M3 | 8 | 2934 | Sitting Position |
|  | M4 | 22 | 5534 | Sleeping Position | whereas a second position taken up by the customer 202A on the mattress 200, following the first position, is represented by the Position ID P2. As discussed above, at Step 104, based on the numerical proximity of the total number of pressure sensors 202B activated and the cumulative pressure effect exhibited by the activated pressure sensors 202B to either the first set of threshold values (indicative of the sitting position) or the second set of threshold values (indicative of the sleeping position), the processor determines whether the first position taken up by the customer 202A on the mattress 200 is a sitting position or a sleeping position. Since, at step 104, the customer is determined to have taken up a sitting position on the mattress 200, position ID P1 denotes the said sitting position.

The following table (Table 5) illustrates the mattress ID (M1), position ID (P1; sitting position), the total number of activated pressure sensors 202B, IDs assigned to the activated pressure sensors (202B), the sequence of the activated pressure sensors 202B, and the cumulative pressure effect exhibited by the activated pressure sensors 202B.

|  |  |  | Sensed Pressure Data ||||
|---|---|---|---|---|---|---|
| Customer ID | Mattress ID | Position ID | Activated Sensor ID | Sensed Pressure (Pascal) | Activated Pressure Sensor Sequence | Cumulative Pressure Effect (Pascal) | Total Activated Pressure Sensors |
| C1 | M1 | P1 | S4 | 717 | S4, S8, S11, S12, S15 | 2831 | 5 |
|  |  |  | S8 | 873 |  |  |  |
|  |  |  | S11 | 394 |  |  |  |
|  |  |  | S12 | 479 |  |  |  |
|  |  |  | S15 | 368 |  |  |  |
|  |  |  | S16 | 428 |  |  |  |
|  |  |  | S20 | 419 |  |  |  |

Referring again to FIG. 1, at step 106, the change of positions exhibited by the customer 202A on the mattress 200 is identified. Essentially, a continuous (or a near-continuous) change in the sensed pressure data derived by the microcontroller 204 associated with mattress 200 denotes a constant change of positions by the customer 202A on the mattress 200. For the sake of brevity and explanation, only mattress 200 (mattress ID: M1) is considered for identifying the positional changes exhibited by the customer 202A (customer ID: C1). At the same time, the customer 202A (customer ID: C1) may change positions, i.e., shift between various positions, even on the mattresses identified by mattress IDs M2, M3, and M4, in addition to M1. In accordance with the present disclosure, the notion that the customer 202A harbors a positive opinion about mattress 200 could be deduced if he is detected, on mattress 200, as continually shifting between multiple sitting positions and sleeping positions, or as occupying either a sleeping position or a sitting position for an extended period of time.

In accordance with the present disclosure, the positions taken up by the customer 202A on the mattress 200 are serially enumerated. For instance, the first position taken up by the customer (Customer ID: C1) 202A on the mattress (Mattress ID: M1) is represented by the Position ID P1, In accordance with the present disclosure, when the customer 202A takes up the sitting position (Position ID: P1) on the mattress 200, the sensors S4, S8, S11, S12, S15, S16, and S20 embedded within the mattress 200 are activated. Subsequently, the microcontroller 204 associated with the mattress 200 calculates the total number of activated sensors 202B to be 'seven,' the sequence of the activated sensors to be 'S4-S8-S11-S12-S15-S16-S20', the pressures (in Pascal) sensed by S4, S8, S11, S12, S15, S16, and S20 to be respectively 717, 873, 394, 479, 368, 428, and 419, and the cumulative pressure effect (in Pascal) to be 2831.

Figure 2B:
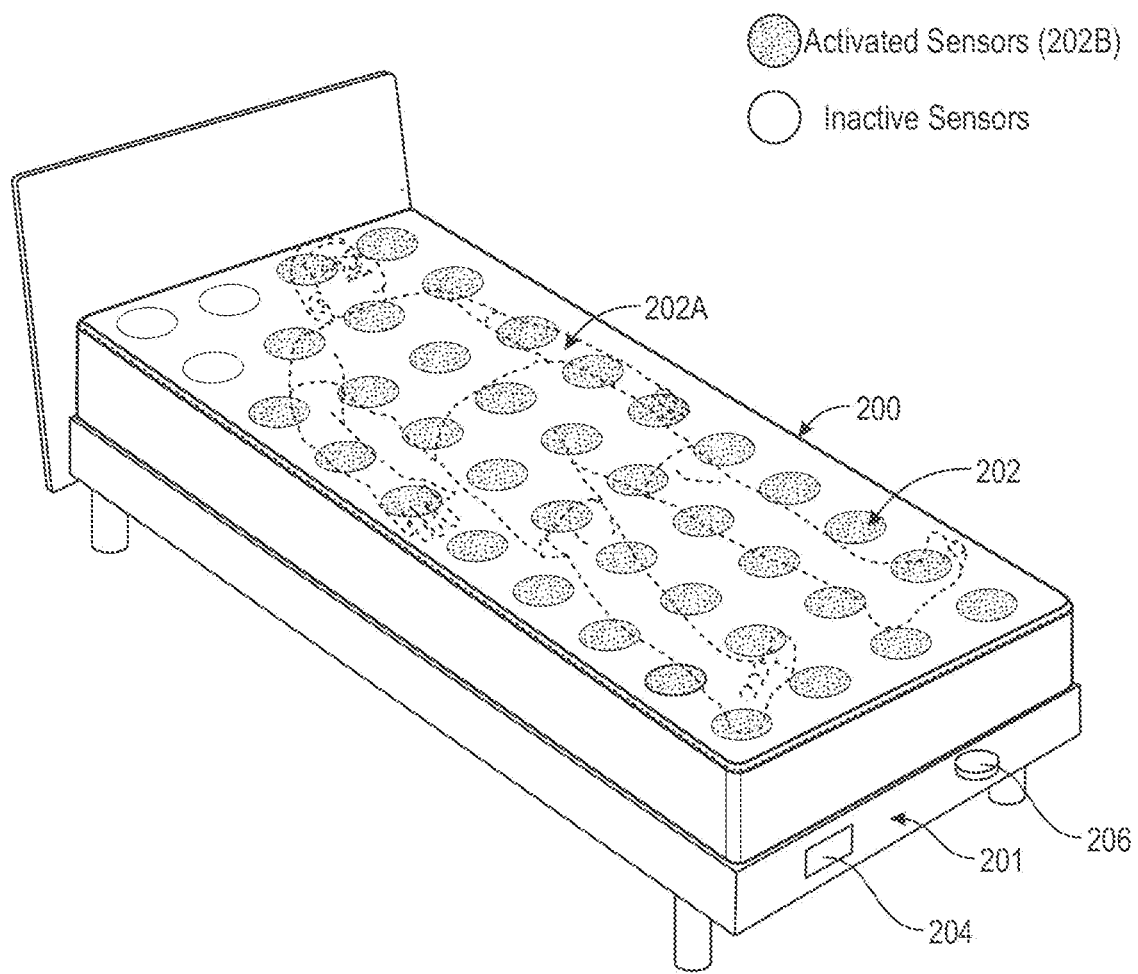
FIG. 2B is a diagram illustrating customer occupying a sleeping position on a mattress offered for sale at a brick and mortar store.

Further, as soon as the customer 202A changes from the sitting position to a sleeping position on the mattress 200 (the customer 202A exhibiting a sleeping position as illustrated in FIG. 2B), a set of pressure sensors different, at least in part, from the pressure sensors activated when the customer 202A was in the sitting position on the mattress 200 are activated. Likewise, when the customer 202A shifts from the sitting position to a sleeping position, changes would also be identified, by the microcontroller 204 embedded within the mattress 200, in the total number of activated pressure sensors 202B, in the sequence of activated pressure sensors 202B, and in the cumulative pressure effect exhibited by the activated pressure sensors 202B. Therefore, when the customer 202A changes from the first position (Position ID: P1) to a second position (Position ID: P2), the following changes would be tracked by the microcontroller 204 embedded within the mattress 200: a change in the position ID, a change in the pressure sensors activated, change in activated pressure sensor IDs, a change in the pressure sensed by the activated pressure sensors 202B, a change in the sequence of activated pressure sensors, a change in the cumulative pressure effect exhibited by the activated pressure sensors 202B, and a change in the total number of activated pressure sensors. Such changes emanating from the shift in customer's position from Position 1 (Position ID: P1; sitting position) to Position 2 (Position ID: P2; sleeping position) are identified by the microcontroller 204 embedded within the mattress 200 (mattress ID: M1). The information described in the below table (Table 6) is also derived by the microcontroller 204 embedded within the mattress 200, as soon as the customer 202A shifts from the sitting position (Position ID: P1) to the sleeping position (Position ID: P2) on the mattress 200. Subsequently, while the mattress ID remains unchanged, the changed information including the position ID, the total number of activated pressure sensors 202B, IDs assigned to the activated pressure sensors (202B), the sequence of the activated pressure sensors 202B, and the cumulative pressure effect exhibited by the activated pressure sensors 202B are transmitted from the microcontroller 204 to the processor embedded within the computer-based device 208 that, in turn, triggers storage of the said information in the memory module, against the customer ID C1. The table (Table 6) provided herein below depicts the changes emanating as a result of the customer 202A shifting from the sitting position to the sleeping position (i.e., from Position P1 to Position P2) on the mattress 200.

sure effect exhibited by the activated pressure sensors 202B, and the comparison between the changed total number of activated pressure sensors 202B and changed cumulative pressure effect exhibited by the activated pressure sensors 202B, and the first set of threshold values and the second threshold values. As is evident from the values described in Table 5 and Table 6, when the customer 202A was in the first position (sitting position; Position ID: P1) on the mattress 200 (mattress ID: M1), a total of 'five' pressure sensors were activated, the sequence of activated pressure sensors was 'S4-S8-S11-S12-S15-S16-S20,' and the cumulative pressure effect exhibited by the activated pressure sensors was 2831 Pascal.

Subsequently, when the customer 202A changed from the sitting position (Position ID: P1) to a sleeping position (Position ID: P2), the total number of activated pressure sensors changed from 'Five' to 'Nineteen,' the sequence of activated pressure sensors changed from 'S4-S8-S11-S12-S15-S16-S20' to 'S1-S4-S5-S8-S9-S11-S12-S15-S17-S19-S20-S23-S25-S26-S27-S28-S29-S31-S35,' and the cumulative pressure effect exhibited by the activated pressure sensors changed from 2831 Pascal to 5859 Pascal. The processor ostensibly tracks such a change and as described above compares the changed total number of activated pressure sensors 202B and changed cumulative pressure effect exhibited by the activated pressure sensors 202B with the first set of threshold values and the second threshold values, and given the numerical proximity of the changed total number of activated pressure sensors 202B and changed cumulative pressure effect exhibited by the activated pressure sensors 202B to the second set of threshold

| Customer ID | Mattress ID | Position ID | Activated Sensor ID | Sensed Pressure (Pascal) | Activated Pressure Sensor Sequence | Cumulative Pressure Effect (Pascal) | Total Activated Pressure Sensors |
|---|---|---|---|---|---|---|---|
| C1 | M1 | P2 | S1 | 286 | S1, S4, S5, S8, S9, S11, S12, S15, S17, S19, S20, S23, S25, S26, S27, S28, S29, S31, S35 | 5859 | 19 |
|  |  |  | S4 | 815 |  |  |  |
|  |  |  | S5 | 183 |  |  |  |
|  |  |  | S8 | 397 |  |  |  |
|  |  |  | S9 | 179 |  |  |  |
|  |  |  | S11 | 391 |  |  |  |
|  |  |  | S12 | 390 |  |  |  |
|  |  |  | S15 | 282 |  |  |  |
|  |  |  | S17 | 186 |  |  |  |
|  |  |  | S19 | 249 |  |  |  |
|  |  |  | S20 | 282 |  |  |  |
|  |  |  | S23 | 273 |  |  |  |
|  |  |  | S25 | 201 |  |  |  |
|  |  |  | S26 | 217 |  |  |  |
|  |  |  | S27 | 437 |  |  |  |
|  |  |  | S28 | 160 |  |  |  |
|  |  |  | S29 | 450 |  |  |  |
|  |  |  | S31 | 327 |  |  |  |
|  |  |  | S35 | 154 |  |  |  |

The fact that the customer 202A has shifted from the sitting position to a sleeping position is ascertained, by the processor, based on an analysis of the changed total number of activated pressure sensors 202B, changed sequence of activated pressure sensors 202B, changed cumulative presvalues, the processor determines that the customer 202A has changed from the sitting position to a sleeping position.

In addition to the changes described above, as a result of the customer 202A changing from the first position to the second position, the pressure applied upon individual pressure sensors and the pressure sensors on which the pressure applied also change, as is evident from the two tables (i.e., Table 5 and Table 6) illustrated above. When the customer 202A was in the first position, pressure values 717, 873, 394, 479, 368, 428, 419 (in Pascal) were applied upon the pressure sensors S4, S8, S11, S12, S15, S16, and S20, respectively. In contrast, when the customer changed to the second position, pressure values 286, 815, 183, 397, 179, 391, 390, 282, 186, 249, 282, 273, 201, 217, 437, 160, 450, 327, and 154 (in Pascal) were applied upon the pressure sensors S1, S4, S5. S8, S9, S11, S12, S15, S17, S19, S20, S23, S25, S26, S27, S28, S29, S31, and S35 respectively.

In accordance with the present disclosure, the microcontroller 204 installed within the computer-based device 208 tracks and identifies the change from the sitting position to the sleeping position, exhibited by the customer 202A on mattress 200, and accordingly analyzes, by accessing the memory module storing the information depicted in the two tables (Table 5 and Table 6) mentioned above, at least the change in the total number of activated pressure sensors 2028 between the sitting position and the sleeping position, change in the sequence of the activated pressure sensors 202B between the sitting position and the sleeping position, and the change in the cumulative pressure effect exhibited by the activated pressure sensors 202B between the sitting position and the sleeping position.

Preferably, the processor categorizes the change from the sitting position to the sleeping position (exhibited by customer 202A on mattress 200) as a continuous change only in an event the time interval corresponding to the change from the sitting position to the sleeping position was less than, for example, 'ten' seconds. However, if the time interval between corresponding to the change from the sitting position to the sleeping position was greater than 'ten' seconds, then such a change could also be construed as a continuous change in the positions taken up by the customer 202A on mattress 200 if the beacon (B1) associated with mattress 200 continues to detect the customer 202A to be in close proximity to mattress 200. And, as described above, continuous (or near-continuous) changes (identified by the microcontroller 204 associated with mattress 200) in the total number of activated pressure changes 202B, the sequence of the activated pressure sensors 202B, and the cumulative pressure effect exhibited by the activated pressure sensors 202B indicate a continuous or a near-continuous change of positions exhibited by the customer 202A (on mattress 200).

Step 106 is repeated for all the remaining mattresses located within the store (i.e., mattress referenced by mattress IDs M2-M4). The processor (installed within the computer-based device 208), identifies continuous changes in the sensed pressure data transmitted from the microcontrollers 204 associated with mattresses M2-M4 and determines the change of positions exhibited by the customer 202A on each of the mattresses M2-M4. If the customer 202A is found to have interacted with, i.e., tested, all the four mattresses, and has changed positions (first position to second position and so on) on all the four mattresses (mattress ID: M1-M4) displayed in the store, then the listing (Table 7) generated by the processor would include the mattress IDs (in this case, M1-M4) corresponding to the mattresses deemed to be occupied by the customer 202A and the total number of positions changed by the customer 202A on each of the mattresses M1-M4. As described earlier, the total number of positions changed by the customer 202A is determined, by the processor, based on the total number of changes observed in the sensed pressure data corresponding to mattresses M1-M4.

| Customer ID | Mattress ID | Total number of positions taken up by the customer 202A |
|---|---|---|
| C1 | M1 | 3 |
| | M2 | 3 |
| | M3 | 2 |
| | M4 | 4 |

In an exemplary embodiment of the present disclosure, the customer 202A has changed from a sitting position to a sleeping position and then back to a second sitting position on the mattress 200 (mattress ID: M1). The position count, in this case, is 'three' (sitting position-sleeping position-position ID: P2; and a second sitting position customer 202A has changed positions thrice—i.e., from a 'sitting position' to a 'sleeping position' and then back to a 'second sitting position'—the microcontroller 204 associated with mattress 200 senses a change, thrice, in the sensed pressure data, i.e., in the total number of activated pressure sensors 202B, the sequence of activated pressure sensors 202B, and the cumulative pressure effect exhibited by the activated pressure sensors 202B. Accordingly, the microcontroller 204 generates three different sets of sensed pressure data-one for each change. Ostensibly, the three different sets of sensed pressure data entail three different timestamps—the timestamps essentially indicating the time when the microcontroller 204 sensed the corresponding pressure data.

Preferably, the microcontroller 204 embedded within the mattress 200 is also configured to track the duration (preferably in milliseconds) for which the total number of activated pressure sensors 202B, and the ensuing sequence of activated pressure sensors 202B, and the cumulative pressure effect exhibited by the activated pressure sensors 202B remained unchanged. Essentially, as long as the customer 202A remains seated on the mattress 200, the total number of activated pressure sensors 202B, and the ensuing sequence of activated pressure sensors 202B, and the cumulative pressure effect exhibited by the activated pressure sensors 202B remain unchanged. And if the customer 202A remains in the sitting position for '10 seconds,' then, ostensibly, the total number of activated pressure sensors 202B, and the ensuing sequence of activated pressure sensors 202B, and the cumulative pressure effect exhibited by the activated pressure sensors 202B remain unchanged for '10 seconds'. In this manner, the microcontroller 204 deduces the duration for which the customer 202A remained on the sitting position on mattress 200, as '10 seconds'.

Subsequently, when the customer 202A shifts to a sleeping position on the mattress 200, the microcontroller 204 calculates the time duration for which the total number of activated pressure sensors 202B, and the ensuing sequence of activated pressure sensors 202B, and the cumulative pressure effect exhibited by the activated pressure sensors 202B, corresponding to the sleeping position, remained unchanged. Likewise, when the customer 202A shifts back to a second sitting position on the mattress 200, the microcontroller 204 calculates the time duration for which the total number of activated pressure sensors 202B, and the ensuing sequence of activated pressure sensors 202B, and the cumulative pressure effect exhibited by the activated pressure sensors 202B, corresponding to the second sitting position, remained unchanged. And in this manner, the microcontroller 204 programmatically deduces the time elapsed before every change in the total number of activated pressure sensors 202B and the ensuing sequence of activated pressure sensors 202B, and the cumulative pressure effect exhibited by the activated pressure sensors 202B (Step 108).

Essentially, based on the number of the total number of changes tracked by the microcontroller 204 (associated with mattress 200) in terms of the total number of activated pressure sensors 202B, the sequence of activated pressure sensors 202B, and the cumulative pressure effect exhibited by the activated pressure sensors 202B—i.e., the total number of times the pressure data sensed by the microcontroller 204 changed—the microcontroller 204 determines the total number of positions occupied by the customer 202A on the mattress 200. For instance, if the microcontroller 204 thrice tracked changes in the total number of activated pressure sensors 202B, the sequence of activated pressure sensors 202B, and the cumulative pressure effect exhibited by the activated pressure sensors 202B, then the number of positions taken up by the customer 202A on the mattress 200 is determined to be '3' (Step 110). Based on the duration for which the total number of activated pressure sensors 202B, and the ensuing sequence of activated pressure sensors 202B, and the cumulative pressure effect exhibited by the activated pressure sensors 202B remain unchanged, the microcontroller 204 calculates the duration associated with each position taken up by the customer 202A on the mattress 200. For example, if the total number of activated pressure sensors 202B, and the ensuing sequence of activated pressure sensors 202B, and the cumulative pressure effect exhibited by the activated pressure sensors 202B, corresponding to a sitting position, remain unchanged for '10 seconds,' then the microcontroller 204 deduces the duration of the sitting position as '10 seconds'.

Further, the microcontroller 204 extrapolates the process described above for every position taken up by the customer 202A on the mattress 200—i.e., calculation of the time duration for which the total number of activated pressure sensors 202B, and the ensuing sequence of activated pressure sensors 202B, and the cumulative pressure effect exhibited by the activated pressure sensors 202B, indicative of a particular position, remained unchanged—and accordingly calculates the time spent by the customer 202A in every position on the mattress 200 (Step 112). The microcontroller 204 sums up the time spent by the customer 202A on every position on the mattress 200 and deduces the total time spent by the customer 202A on the mattress 200.

In accordance with the present disclosure, the steps 108, 110, and 112 are repeated for each of the remaining mattresses M2-M4. And the number of positions taken up by the customer 202A on each of the remaining mattresses M2-M4, the time spent by the customer 202A in each of the positions on each of the remaining mattresses M2-M4, and the total time spent by the customer 202A on each of the remaining mattresses M2-M4 are determined.

Provided herein below is an exemplary table (Table 8) illustrating the time spent by the customer 202A (customer ID: C1) on every position at mattress 200 (mattress ID: M1) and mattress (identified by mattress ID) M2, and the total time spent by the customer on mattress 200 (M1) and mattress M2.

| Customer ID | Mattress ID | Position IDs | Total number of positions | Duration for Position 1 (P1) (In seconds) | Duration for Position 2 (P2) (In seconds) | Duration for Position 3 (P3) (In seconds) | Total Time (P1 + P2 + P3) (In Seconds) |
|---|---|---|---|---|---|---|---|
| C1 | M1 | P1, P2, P3 | 3 | 10 | 15 | 10 | 35 |
|  | M2 | P1, P2, P3 | 3 | 12 | 17 | 13 | 42 |

In accordance with the present disclosure, at step 114, the processor installed within the computer-based device 208 implements a neural network. Ostensibly, the instruction to implement the neural network is issued from the said processor. The neural network model, in accordance with the present disclosure, is a computer-implemented model trained to recognize patterns in, inter-alia, customer 202A and ostensibly other customers testing the mattresses, in the affinity score associated with each of the mattresses displayed in-store. In accordance with the present disclosure, particularly, the information indicative of the customer 202A (customer ID: C1) interacting with (i.e., testing) the mattress 200 (mattress ID: M1) is fed to the neural network as an input (i.e., training data), Preferably, the information indicative of the customer 202A (C1) interacting with the mattress 200 (M1) includes the total number of activated pressure sensors 202B for each position taken up by the customer 202A on the mattress 200, the sequence of activated pressure sensors 202B for each position taken up by the customer 202A on the matiress 200, cumulative pressure effect exhibited by the activated pressure sensors 202B for each position taken up by the customer 202A on the mattress 200, the total number of positions taken up by the customer 202A on the mattress 200, time (duration) spent by the customer 202A in each position on the mattress 200, total time (duration) spent by the customer 202A on mattress 200, information indicative of each change in the number of activated pressure sensors 202B, information indicative of each change in the sequence of activated pressure sensors 202B (identified on mattress 200), and information indicative of each change in the cumulative pressure effect exhibited by activated pressure sensors 202B (each change having been identified at mattress 200, by the microcontroller 204 associated therewith). In accordance with the present disclosure, the information indicative of the customer's (202A) interaction with the remaining mattresses (M2-M4) displayed in the store is also fed to the neural network as a part of the input.

In accordance with the present disclosure, the neural network processes the input elements, and determines, based, at least in part, on the input elements, patterns in the total number of positions taken up by the customer 202A on each of the mattresses (including mattress 200 and mattress M2, M3, and M4), patterns in the time spent by the customer 202A in each position on each of the mattresses, the pattern in which customer 202A changes positions on each of the mattresses—i.e., the customer 202A alternating between sitting positions and sleeping positions, the customer 2024 taking up successive sitting positions, the customer 202A taking up successive sleeping positions, the customer 202A alternating between different sleeping positions and the customer 202A alternating between different sitting positions—and patterns in the total time spent by the customer 202A on each of the mattresses.

In accordance with the present disclosure, based on the total number of positions taken up by the customer 202A on each of the mattresses (M1-M4), the pattern in which customer 202A changes positions on each of the mattresses (M1-M4), the time spent by the customer 202A in each position on each of the mattresses (M1-M4), and total time spent by the customer 202A on each of the mattresses (M1-M4), the customer's affinity for each of the said mattresses (i.e., mattress 200, mattress M2, mattress M3, and mattress M4) is calculated. Preferably, while calculating the customer's affinity towards each of the said mattresses, the processor triggers the mattress shopping application installed within the customer's handheld device 210 to determine if the customer 202A has scanned, via the handheld device 210, barcodes corresponding to any of the mattresses M1-M4, viewed (either repeatedly or intermittently) reviews corresponding to the mattresses M1-M4, liked or disliked web pages describing any of the mattresses M1-M4, marked as favorite any web pages accessed via the mattress shopping application and describing any of the said mattresses M1-M4, and viewed any product description videos on the mattress shopping application and corresponding to the said mattresses M1-M4. In an event the customer 202A is determined, by the processor, as having performed any of the aforementioned web-based activities on the mattress shopping application installed on the handheld device 210, then the processor takes into consideration a predetermined weightage assigned to the performed web-based activity while calculating the affinity of the customer 202A for any of the said mattresses.

Subsequently, an affinity score is determined based on the customer's (202A) affinity towards each of the mattresses (i.e., mattress 200, mattress M2-M4). The affinity score is preferably represented using a numerical value arranged along a predetermined scale (for example, on a scale of 1 to 10), with a higher affinity represented by a higher numerical value (and thus a higher affinity score) and a lower affinity represented by a comparatively lower numerical value (and thus a lower affinity score). In accordance with the present disclosure, the affinity score indicative of the customer's (202A) affinity towards each of the mattresses, i.e., mattress 200, mattress M2-M4, is also considered as being indicative of a probability that the customer would purchase any of the said mattresses, i.e., mattress 200, mattress M2-M4 (step 116).

In accordance with the present disclosure, the affinity score is calculated based on the total number of positions taken up by the customer 202A on each of the mattresses (M1-M4), the total number of times the customer 202A changed positions on each of the mattresses (M1-M4), the total time spent by the customer 202A in each position on each of the mattresses (M1-M4), and total time spent by the customer 202A on each of the mattresses (M1-M4), the total time spent by the customer 202A in sitting positions on each of the mattresses (M1-M4), and the total time spent by the customer 202A in sleeping positions on each of the mattresses (M1-M4), the total number of sitting positions taken up by the customer 202A on each of the mattresses (M1-M4), and the total number of sleeping positions taken up by the customer 202A on each of the mattresses (M1-M4) inter-alia. Generally, greater the values attributed to the aforementioned factors, greater the affinity score attributed to the mattresses M1-M4. As described earlier, the affinity score is a numerical value, and is a function of the total number of positions taken up by the customer 202A on each of the mattresses (M1-M4), the total number of times the customer 202A changed positions on each of the mattresses (M1-M4), the total time spent by the customer 202A in each position on each of the mattresses (M1-M4), and total time spent by the customer 202A on each of the mattresses (M1-M4), the total time spent by the customer 202A in sitting positions on each of the mattresses (M1-M4), and the total time spent by the customer 202A in sleeping positions on each of the mattresses (M1-M4), the total number of sitting positions taken up by the customer 202A on each of the mattresses (M1-M4), and the total number of sleeping positions taken up by the customer 202A on each of the mattresses (M1-M4).

In accordance with the present disclosure, the processor embedded within the computer-based device 208 communicates with the mattress shopping application (also referred to as an app') executed on the handheld device 210 accessible to the customer 202A. Typically, the processor determines if the customer 202A has, for example, via the mattress shopping application installed on the handheld device 210, scanned a barcode embedded within the mattress 200 (with the intention of watching a product promotional video corresponding to mattress 200), or accessed and liked an app-screen describing the mattress 200, or repetitively viewed an app-screen describing the mattress 200 in detail, or repetitively accessed an app-screen reviewing the mattress 200. In the event the customer 202A is deemed to have performed any of the aforementioned app-based activities via his mattress shopping application installed on the handheld device 210, then such app-based activities are analyzed by the processor. Based on the analysis of the said app-based activities performed by the customer 202A, the processor selectively augments the affinity score attributed to the combination of the customer 202A and the mattress 200. Typically, the processor programmatically retrieves the app-screen data describing the app-screens accessed by the customer 202A on the mattress shopping application, and based on an analysis of the app-screen data determines the actions or activities performed by the customer 202A on his handheld device 210 and via the mattress shopping application. Typically, the frequency of the occurrence of such app-related activities (on the mattress shopping application accessible to the customer 202A on his handheld device 210) is used as a barometer, by the processor, to augment the affinity score representative of the affinity of the customer 202A to the mattress 200. Essentially, higher the number of app-activities, greater the affinity score attributed to the combination of customer 202A and mattress 200.

Additionally, the mattress shopping application executed on the customer's handheld device 210 is also configured to record and analyze web-based activities performed by the customer 202A on third party websites, via the handheld device 210. Essentially, the mattress shopping application continually tracks inter-alia the applications and client-server sessions executed on the customer's handheld device 210, and generates specific statistical information directed to the mattress shopping related activities (including viewing reviews for mattress 200, accessing, liking or disliking web pages describing mattress 200, marking as favorite web pages describing mattress 200, viewing videos describing mattress 200) implemented on third party websites accessed via the handheld device 210. Essentially, the statistical information generated by the mattress shopping application includes the frequency of occurrence of aforementioned web-based activities on the said third-party websites. Typically, the frequency of the occurrence of such web-based activities is used as another barometer, by the processor, to further augment the affinity score representative of the affinity of the customer 202A to the mattress 200. Essentially, higher the number of app-activities, greater the affinity score attributed to the combination of customer 202A and mattress 200.

In an exemplary embodiment of the present disclosure, if the customer 202A is determined as having not performed any web-based activities in respect of mattresses M1-M4, on his handheld device 210 executing the mattress shopping application, then the affinity score is calculated solely based on the total number of positions taken up by the customer 202A on each of the mattresses (M1-M4), the total number of times the customer 202A changed positions on each of the mattresses (M1-M4), the total time spent by the customer 202A in each position on each of the mattresses (M1-M4), and total time spent by the customer 202A on each of the mattresses (M1-M4), the total time spent by the customer 202A in sitting positions on each of the mattresses (M1-M4), and the total time spent by the customer 202A in sleeping positions on each of the mattresses (M1-M4), the total number of sitting positions taken up by the customer 202A on each of the mattresses (M1-M4), and the total number of sleeping positions taken up by the customer 202A on each of the mattresses (M1-M4).

In accordance with yet another exemplary embodiment of the present disclosure, the processor embedded within the computer-based device 208 prioritizes the information indicative of the total number of positions taken up by the customer 202A on each of the mattresses (M1-M4), the total number of times the customer 202A changed positions on each of the mattresses (M1-M4), the total time spent by the customer 202A in each position on each of the mattresses (M1-M4), and total time spent by the customer 202A on each of the mattresses (M1-M4), the total time spent by the customer 202A in sitting positions on each of the mattresses (M1-M4), and the total time spent by the customer 202A in sleeping positions on each of the mattresses (M1-M4), the total number of sitting positions taken up by the customer 202A on each of the mattresses (M1-M4), and the total number of sleeping positions taken up by the customer 202A on each of the mattresses (M1-M4), over the statistical information indicative of the mattress shopping related activities performed on third-party websites, and the information indicative of the occurrence of the app-related activities, for the calculation of the affinity score indicative of a customer's (202A) affinity towards mattresses M1-M4.

In accordance with the present disclosure, the neural network is further configured to implement a pattern recognition operation on the input elements, and learn, based, at least in part, on the input elements, patterns in the customer 202A interacting with mattresses (M1-M4; mattress M1 identified using the reference numeral 200). Essentially, the neural network learns a (first) pattern in which the pressure sensors 202 are activated when the customer 202A takes up sitting positions on the mattresses. Further, the neural network also learns a (second) pattern in which pressure sensors 202 are activated when the customer 202A takes up sleeping positions on mattresses. Further, the neural network also recognizes (learns) a pattern in the total number of activated pressure sensors when the customer takes up sitting positions and sleeping positions (on mattresses), respectively. Further, the neural network also recognizes (learns) a pattern in the cumulative pressure effect exhibited by the activated pressure sensors 202B when the customer 202A takes up sitting positions and sleeping positions (on the mattresses), respectively. Further, the neural network learns a (third) pattern in which the sequence of activated pressure sensors, the total number of activated pressure sensors, and the cumulative effect exhibited by the activated pressure sensors change when the customer 202A shifts from one position to another position (on the mattresses). The neural network also learns of a pattern in the time spent by the customer 202A in every position on every mattress, and a pattern in which the total member of activated pressure sensors 202B, and the ensuing sequence of activated pressure sensors 202B and the cumulative pressure effect exhibited by the activated pressure sensors 202B change with reference to time. Further, the neural network also learns of patterns in changes to the total number of activated pressure sensors 202B (for every mattress), patterns in changes to the sequence of activated pressure sensors 202B (for every mattress), and patterns in changes to the cumulative pressure exhibited by activated pressure sensors 202B (for every mattress). Further, the neural network also learns of patterns in the positions occupied by the customer 202A on each of the mattresses. Further, the neural network learns of patterns in changes to the total number of activated pressure sensors 202B with reference to every change in the customer's position on each of the mattresses, patterns in changes to the sequence of activated pressure sensors 202B with reference to every change in the customer's position on each of the mattresses, and patterns in changes to the cumulative pressure exhibited by the activated pressure sensors 202B with reference to every change in the customer's position on each of the mattresses.

In accordance with the present disclosure, the patterns corresponding to the customer's (202A) interaction with mattresses M1-M4, learned by the neural network, are fed back to the neural network as 'training data' to enable the neural network to enhance the calculation of affinity scores indicative of future customers' affinity toward the mattresses M1-M4. The patterns corresponding to the customer's (202A) interaction with mattresses M1-M4 are also used to train the neural network to forecast the average time future customers are likely to spend (interacting with the mattresses; testing the mattress) on each of the mattresses M1-M4, the total number of positions future customers may take on mattresses (M1-M4), the average time future customers may spend in sitting positions and sleeping positions on mattresses (M1-M4), and the probability that future customers would purchase any of the mattresses (M1-M4). In accordance with the present disclosure, the statistical information indicative of the mattress shopping related activities performed on third-party websites, and the information indicative of the occurrence of the app-related activities are also fed to the neural network as a part of the training data.

In accordance with the present disclosure, after the calculation of the customer's (202A) affinity towards each of the mattresses M1-M4 and the ensuing affinity scores, the indoor map is updated, by the processor, with the affinity scores corresponding to each of the mattresses M1-M4. In accordance with the present disclosure, the microcontrollers associated respectively with mattresses M1-M4 are also configured to track and identify the time (of the day) at which the customer 202A engaged each of the mattress M1-M4. Each of the microcontrollers transmits information indicative of the time at which they were tested by the customer 202A, along with the customer ID (in this case, C1) after confirming the presence of the customer 202A in proximity to the respective mattresses (M1-M4) via an analysis of the 'customer location information' obtained from the beacons associated respectively with the mattresses M1-M4. Subsequently, the processor updates the indoor store map by creating a virtual pathway interconnecting the locations of the mattresses M1-M4 on the indoor store map, preferably in the order in which they were tested by the customer 202A. FIG. 4, in accordance with the present disclosure, illustrates an exemplary virtual customer pathway that describes the customer 202A as having tested (interacted with/engaged) mattress M1, mattress M3, mattress M7, and Mattress M5, in that order.

Figure 5:
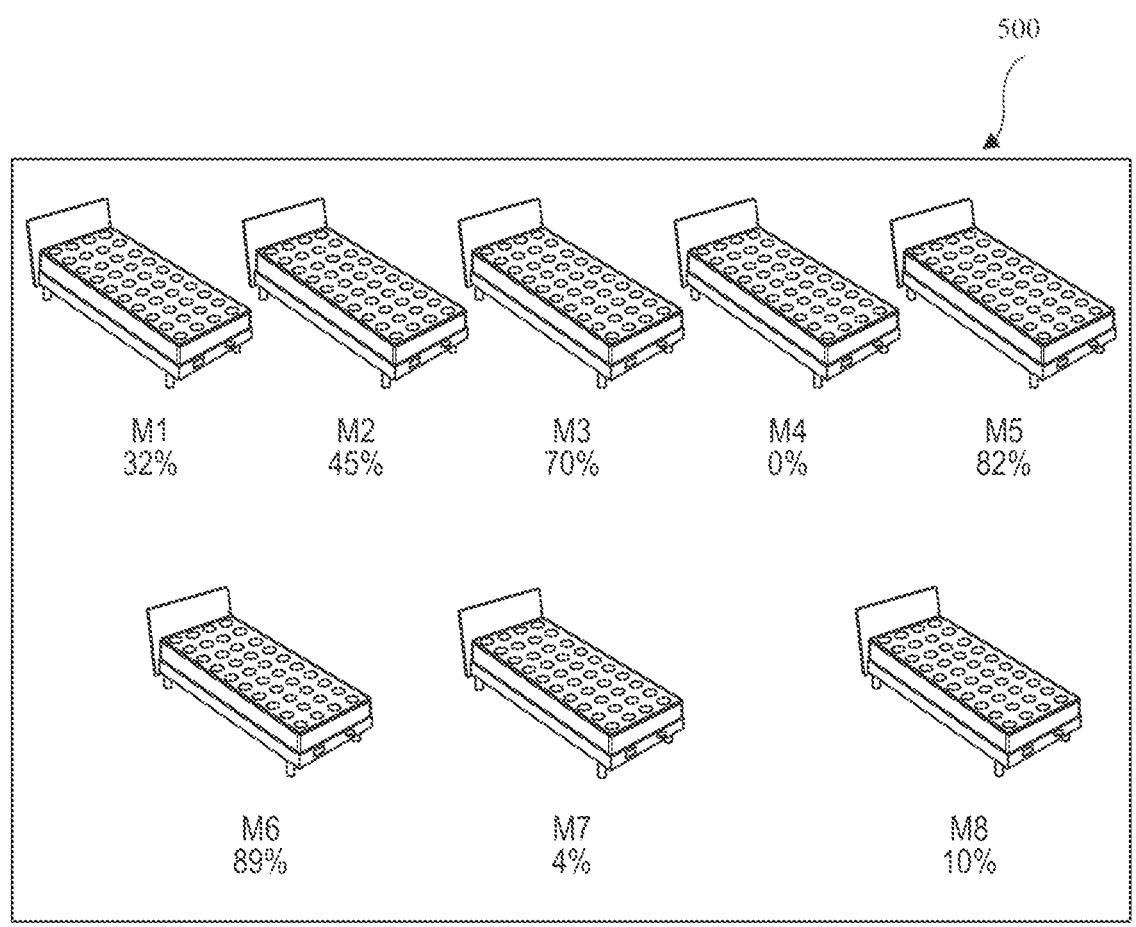
FIG. 5 is a diagram illustrating the mattress sales conversion rates generated by the computer-implemented system, method, and computer program product of the present disclosure, in respect of every mattress displayed for sale in a brick and mortar store.

In accordance with the present disclosure, FIG. 5 illustrates a user interface screen 500 displayed typically on the computer-based device 208, describing the 'conversion rate' associated with every mattress displayed in the brick and mortar store. Even though FIG. 5 illustrates 'eight' mattresses, i.e., M1-M8, the functionalities of the computer-implemented system, method, and the computer program product have been explained taking into consideration the mattresses M1-M4. In accordance with the present disclosure, the processor (embedded within the computer-based device 208) determines the total number of positions taken up by each of the customers on each of the mattresses M1-M4. Subsequently, the processor also determines the total number of units of mattresses M1-M4 sold-off from the brick and mortar store. And the processor computes the 'mattress sales conversion rate' as a function of the total number of mattress tests performed by each of the customers on each of the mattresses M1-M4 and the total number of units of mattresses M1-M4 sold-off. Preferably, the processor derives the total number of units from a Point of Sale (POS) accounting system communicably coupled to the computer-based device 208. And in this manner, while determining the 'mattress sales conversion rate', the processor considers only those customers who have truly engaged with and thus truly tested the mattresses M1-M4, and consequentially neglects those customers who have not engaged with/interacted with mattresses M1-M4 by way of mattress tests, thereby enhancing the accuracy of the process of calculation of 'mattress sales conversion rate'.

In accordance with the present disclosure, the location of the salesperson (salesperson ID: SP1) is also tracked in addition to the location of the customer (customer ID: C1). As discussed earlier, the salesperson is also assigned a unique salesperson ID through the native retail application installed in the salesperson's tablet device. And as discussed earlier, the native retail application is responsive to the unique identifiers (in the preferred embodiment, the unique identifiers are respective mattress IDs) emitted by the beacons B1-B4 associated with mattresses M1-M4.

In accordance with the preferred embodiment of the present disclosure, the native retail application wirelessly receives the unique identifiers emitted from the beacons (B1-B4) associated with the mattresses (M1-M4). Subsequently, the native retail application processes the unique identifiers transmitted from the beacons B1-B4, and based on a signal strength associated with the received unique identifiers, calculates the proximity, i.e., the physical distance between the mattresses M1-M4 and the salesperson's tablet device. Alternatively, the native retail application could also be pre-programmed to transmit a data packet (a pseudorandom number) to the beacons (B1-B4) installed within the mattresses M1-M4, and estimate a distance between the salesperson's tablet device (executing the native retail application) based on the total time elapsed before a reply is received from the beacons B1-B4, in response to the transmitted data packet.

In accordance with the preferred embodiment of the present disclosure, when the native retail application installed within the salesperson's tablet device detects that the salesperson's tablet device is in close proximity to, for example, the mattress identified by mattress ID M1, the native retail application further determines if the physical distance between the salesperson's tablet device and the mattress identified by mattress ID M1 is less than a pre-determined threshold value (for example, one meter). If the physical distance between the salesperson's tablet device and the mattress identified by mattress ID M1 is indeed less than the predetermined threshold value, then the native retail application programmatically associates the mattress identified by mattress ID M1 with the salesperson (whose tablet device is executing the native retail application) and interlinks the unique salesperson ID (associated with the salesperson whose tablet device is executing the native retail application) with the unique mattress ID (of the mattress determined to be in proximity to the salesperson's tablet device; and in this case the mattress ID is M1), and transmits the interlinked mattress ID and salesperson ID (i.e., M1 and SP1) to the processor installed within the computer-based device that in turn, triggers the storage of the interlinked mattress ID and salesperson ID on the memory module, while ascertaining that the salesperson (identified by the unique salesperson ID: SP1) is in proximity to the mattress identified by mattress ID M1. And simultaneously, if the mattress shopping application installed within the customer's handheld device detects that the customer's handheld device is also in close proximity to the mattress identified by mattress ID M1, and that the physical distance between the customer's handheld device and the mattress identified by mattress ID M1 is less than a pre-determined threshold value (for example, one meter), then the mattress shopping application also associates, programmatically, the mattress identified by mattress ID M1 with the customer (whose handheld device is executing the mattress shopping application) and interlinks the unique customer ID (associated with the customer whose handheld device (210) is executing the mattress shopping application) and the unique mattress ID (of the mattress determined to be in proximity to the customer's handheld device; and in this case the mattress ID is M1), and transmits the interlinked mattress ID and customer ID (i.e., M1 and C1) to the processor installed within the computer-based device. Both the mattress shopping application (installed within the customer's handheld device) and the native retail application (installed within the salesperson's tablet device) are configured to transmit to the processor timestamps indicative of the time when the customer's handheld device was in proximity to a particular mattress (in this case mattress M1), and the salesperson's tablet device was in proximity to a particular mattress (also mattress M1, in this case) respectively. And, preferably, the said timestamps are transmitted from the customer's mattress shopping application and salesperson's native retail application, along with the transmission of interlinked mattress ID and customer ID and the interlinked mattress ID and salesperson ID, respectively. The processor, on its part, determines, based on an analysis of the respective timestamps as well as the interlinked mattress ID and customer ID and the interlinked mattress ID and salesperson ID, that the mattress ID is common to both the interlinked mattress ID-customer ID pair and interlinked mattress ID-salesperson ID pair, and accordingly ascertains that both the salesperson (identified by salesperson ID: SP1) and the customer (identified by customer ID: CD) are in proximity, in this case, to the mattress identified by mattress ID M1. In this manner, the method envisaged by the present disclosure allows for the location of the salesperson to be tracked, in real-time, vis-à-vis the location of the customer 202A as well as the location of the mattresses M1-M4, And by allowing for the location of the salesperson to be tracked vis-à-vis the location of the customer 202A, and the latter's location vis-à-vis mattresses M1-M4, the method envisages for the interactions between the customer and salesperson to be extrapolated when both the customer and the salesperson are detected to be in proximity to the same mattress (one amongst mattresses M1-M4).

In accordance with the present disclosure, if pressure sensors 202 embedded within a mattress (for example, mattress M1, denoted by reference numeral 200) are activated at the same time, but in two different clusters, and if two different sequences of activation of pressure sensors are observed at a different position on the mattress 200, accompanied by the detection, by the microcontroller 204 associated with mattress 200, of two different cumulative pressure effects (exhibited by the activated pressure sensor 202B clusters) visible on mattress 200, then the processor determines that the mattress 200 is occupied by two different people (the customer 202A-Customer ID: C1, and a second occupant) at the same time. Preferably, the second occupant is also assigned the same customer ID as customer 202A, i.e., customer ID C1, as long as the actions—i.e., the mattress engagements/interactions—of the second occupant mirror the mattress engagements/interactions undertaken by the customer 202A (customer ID: C1). Further, it is also preferable that the information corresponding to the mattress engagements/interactions performed by the second occupant—i.e., total number of activated pressure sensors 202B, the sequence of activated pressure sensors 202B, and the cumulative pressure effect exhibited by the activated pressure sensors 202B (collectively, the 'sensed pressure data')—is programmatically combined with the information (i.e., sensed pressure data) corresponding to the mattress engagements/interactions performed by the customer 202A (customer ID: C1).

The assertion about two different people having occupied the mattress 200 (M1) at the same time is validated by the analysis of the (two) timestamps associated with the detection of activation of pressure sensors 202B at two different clusters and the ensuing two different sequences of activation of pressure sensors and the two different cumulative pressure effects if the analysis determines the two timestamps to be equal. And the simultaneous presence of two people on the mattress 200 implies that two people are simultaneously interacting with (i.e., testing) the mattress 200, and the sensed pressure data shared by the microcontroller 204 in such cases could be selectively prioritized over the other sensed pressure data sets, for simultaneous feedback (about the mattress 200, for example) from two people could be considered comparatively more assertive and possibly more accurate.

In accordance with an exemplary embodiment of the present disclosure, a mattress sheet (or a bedsheet; not shown in figures) embodying a secondary beacon (S1; not shown in figures) is handed out to the customer 202A. It is possible that when the customer 202A is engaging/interacting with mattress M1, the bedsheet incorporating the secondary beacon S1 is draped upon mattress M1. Likewise, when the customer 202A is engaging/interacting with mattress M2, the bedsheet incorporating the secondary beacon S1 is draped upon mattress M2. The advantage stemming from the use of the secondary beacon S1 and the bedsheet embedded with the secondary beacon S1 is that the secondary beacon S1 also transmits a unique identifier recognizable to the mattress shopping application installed within the customer's handheld device 210 and the native retail application installed with the salesperson's (SP1) tablet device, and facilitates (real-time) calculation of the physical distance between the mattresses M1-M4, the customer's handheld device 210, and the salesperson's tablet device, thereby augmenting the customer (202A) location information and the salesperson location information derived by the beacons B1-B4.

The functionalities exhibited by the secondary beacon S1 are similar to the functionalities exhibited by the beacons B1-B4 associated with the mattresses M1-M4. Therefore, details about the functioning of the secondary beacon S1 are skipped for the sake of brevity. When the native retail application installed within the salesperson's tablet device detects that the salesperson's tablet device is in close proximity to, for example, the mattress having been assigned the mattress ID M1, as well as the bedsheet incorporating the secondary beacon S1 (depending upon the physical distance measured based on the signal strength associated with the unique identifier received by the native retail application from the secondary beacon S1, and the unique identifier (M1) received by the native retail application from the beacon B1), the native retail application ascertains that the bedsheet incorporating the secondary beacon S1 and indeed customer 202A, who was previously handed the said bedsheet, are engaged with the mattress identified by the mattress ID M1. In this manner, the secondary beacon S1 reinforces/augments the salesperson location information derived by the beacons B1-B4 in cooperation with the native retail application installed within the salesperson's tablet device. Likewise, the secondary beacon S1 augments/reinforces the customer (202A) location information derived by the beacons B1-B4 in cooperation with the mattress shopping application installed within the customer's handheld device 210. Ostensibly, when the customer 202A decides to terminate interacting with the mattresses (M1-M4) displayed with the brick and mortar store, the bedsheet embodying the secondary beacon S1 is returned to the store manager or the salesperson, who, in turn, disinfects the said bedsheet, thereby readying it for use by another customer.

In the event the customer 202A is not assigned a customer ID, firstly automatically via the mattress selection application, for the customer 202A is deemed as not having access to his handheld device 210, and secondly manually by either a store manager of a stores salesperson, for they inadvertently failed to notice the arrival of the customer 202A, then in accordance with an exemplary embodiment of the present disclosure, the unique identifier emanating from the secondary beacon S1 embedded within the bedsheet could be programmatically configured to double up as the customer ID as well, for the customer 202A is assigned the bedsheet embodying the secondary beacon S1 as long as he is present within the premises of the store, and is instructed to drape the bedsheet over every mattress he interacts/engages with. In accordance with the present disclosure, Bluetooth receiver devices (preferably, Bluetooth Low Energy (BLE) receiver devices; not shown in figures) are installed at predetermined locations across the store, but in proximity to each of the mattresses (M1-M4) displayed therein, such that they accurately decipher the unique identifier transmitted by the secondary beacon S1 and identify the current location of the bedsheet embodying the secondary beacon S1, relative to the location of one of the mattresses M1-M4. For instance, if the customer 202A drapes the mattress M2 with the bedsheet, then the Bluetooth receiver device positioned in proximity to the mattress M2 receives the unique identifier transmitted by the secondary beacon S1 embedded within the bedsheet. Preferably, the Bluetooth receiver device (located in proximity to mattress M2) also ascertains a timestamp indicative of the time at which the unique identifier transmitted by the secondary beacon S1 was captured.

And when the customer 202A begins 'testing' or 'engaging' or 'interacting with' mattress M2, after draping the bedsheet thereon, the ensuing sensed pressure data is captured by the microcontroller 204 embedded within mattress M2, along with a corresponding timestamp indicative of the time at which the pressure data was sensed on mattress M2. Subsequently, the sensed pressure data, the mattress ID (i.e., M2), and the timestamp indicative of the time at which the pressure data was sensed is transmitted to the processor installed within the computer-based device 208. Simultaneously, the Bluetooth receiver device installed in proximity to the mattress M2 also informs the processor about the presence of secondary beacon S1 and, in turn, the bedsheet, and, in turn, the customer 202A, in proximity to mattress M2. Additionally, the Bluetooth receiver device also transmits the timestamp indicative of the time at which the unique identifier transmitted by the secondary beacon S1 was captured. And ostensibly, based on a comparison between the timestamp received from the Bluetooth receiver device (indicative of the time at which the unique identifier transmitted by the secondary beacon S1 was captured) and the timestamp received from the microcontroller 204 embedded within the mattress M2 (indicative of the time at which the pressure data was sensed on mattress M2), the processor identifies the customer 202A to be currently engaging with/interacting with/testing the mattress M2, in the event the timestamp received from the Bluetooth receiver device and the timestamp received from the microcontroller 204 installed within mattress M2 are found to equivalent or at least near equivalent.

In accordance with another exemplary embodiment of the present disclosure, a pillow (not shown in figures) embodying a tertiary beacon (T1; not shown in figures) is handed out to the customer 202A, in addition to the bedsheet incorporating the secondary beacon S1. It is possible that when the customer 202A is engaging/interacting with mattress M1, the pillow incorporating the tertiary beacon T1 is also placed on mattress M1 (in addition to the bedsheet incorporating the secondary beacon S1). Likewise, when the customer 202A is engaging/interacting with mattress M2, the pillow incorporating the tertiary beacon T1 is placed on mattress M2 (in addition to the bedsheet incorporating the secondary beacon S1). The advantage stemming from the use of the tertiary beacon T1 and the pillow embedded with the tertiary beacon T1 is that the tertiary beacon T1 also transmits a unique identifier recognizable to the mattress shopping application installed within the customer's handheld device 210 and the native retail application installed with the salesperson's (SP1) tablet device, and facilitates (real-time) calculation of the physical distance between the mattresses M1-M4, the customer's handheld device 210, and the salesperson's tablet device, thereby augmenting the customer (202A) location information and the salesperson location information derived by the beacons B1-B4 and the secondary beacon S1. The functionalities exhibited by the tertiary beacon T1 are similar to the functionalities exhibited by the beacons B1-B4 associated with the mattresses M1-M4 and the secondary beacon S1 incorporated within the bedsheet handed out to the customer 202A.

Therefore, details about the functioning of the tertiary beacon T1 are skipped for the sake of brevity. When the native retail application installed within the salesperson's tablet device detects that the salesperson's tablet device is in close proximity to, for example, the mattress having been assigned the mattress ID M1, as well as the pillow incorporating the tertiary beacon T1 (depending upon the physical distance measured based on the signal strength associated with the unique identifier received by the native retail application from the tertiary beacon T1, and the unique identifier (M1) received by the native retail application from the beacon B1), the native retail application ascertains that the pillow incorporating the tertiary beacon T1 and indeed customer 202A, who was previously handed the said pillow, are engaged with the mattress identified by the mattress ID M1. In this manner, the tertiary beacon T1 reinforces/augments the salesperson location information derived by the beacons B1-B4 and the secondary beacon S1, in cooperation with the native retail application installed within the salesperson's tablet device. Likewise, the tertiary beacon T1 augments/reinforces the customer (202A) location information derived by the beacons B1-B4 and the secondary beacon S1, in cooperation with the mattress shopping application installed within the customer's handheld device 210. Ostensibly, when the customer 202A decides to terminate interacting with the mattresses (M1-M4) displayed with the brick and mortar store, the pillow embodying the tertiary beacon T1 is returned to the store manager or the salesperson, who, in turn, disinfects the said pillow, thereby readying it for use by another customer.

In the event the customer 202A is not assigned a customer ID, firstly automatically via the mattress selection application, for the customer 202A is deemed as not having access to his handheld device 210, and secondly manually by either a store manager of a stores salesperson, for they inadvertently failed to notice the arrival of the customer 202A, then in accordance with an exemplary embodiment of the present disclosure, the unique identifier emanating from the tertiary beacon T1 embedded within the pillow could be programmatically configured to double up as the customer ID as well, for the customer 202A is assigned the pillow embodying the tertiary beacon T1 as long as he is present within the premises of the store, and is instructed to place the pillow atop every mattress he interacts/engages with. In accordance with the present disclosure, Bluetooth receiver devices (preferably, Bluetooth Low Energy (BLE) receiver devices) installed in proximity to each of the mattresses (M1-M4) are triggered to accurately decipher the unique identifier transmitted by the tertiary beacon T1 and identify the current location of the pillow embodying the tertiary beacon T1, relative to the location of one of the mattresses M1-M4. For instance, if the customer 202A places the pillow on mattress M2, then the Bluetooth receiver device positioned in proximity to the mattress M2 receives the unique identifier transmitted by the tertiary beacon T1 embedded within the pillow. Preferably, the Bluetooth receiver device (located in proximity to mattress M2) also ascertains a timestamp indicative of the time at which the unique identifier transmitted by the tertiary beacon T1 was captured.

And when the customer 202A begins 'testing' or 'engaging' or 'interacting with' mattress M2, after placing the pillow atop mattress M2, the ensuing sensed pressure data is captured by the microcontroller 204 embedded within mattress M2, along with a corresponding timestamp indicative of the time at which the pressure data was sensed on mattress M2. Subsequently, the sensed pressure data, the mattress ID (i.e., M2), and the timestamp indicative of the time at which the pressure data was sensed is transmitted to the processor installed within the computer-based device 208. Simultaneously, the Bluetooth receiver device installed in proximity to the mattress M2 also informs the processor about the presence of tertiary beacon T1 and, in turn, the pillow, and, in turn, the customer 202A, in proximity to mattress M2. Additionally, the Bluetooth receiver device also transmits the timestamp indicative of the time at which the unique identifier transmitted by the tertiary beacon T1 was captured. And ostensibly, based on a comparison between the timestamp received from the Bluetooth receiver device (indicative of the time at which the unique identifier transmitted by the tertiary beacon T1 was captured) and the timestamp received from the microcontroller 204 embedded within the mattress M2 (indicative of the time at which the pressure data was sensed on mattress M2), the processor identifies the customer 202A to be currently engaging with or interacting with or testing the mattress M2, in the event the timestamp received from the Bluetooth receiver device and the timestamp received from the microcontroller 204 installed within the mattress M2 are found to equivalent or at least near equivalent.

Technical Advantages

The technical advantages envisaged by the present disclosure include the realization of a computer-implemented method and system, and a computer program product for minutely tracking and analyzing customer interactions with bedding mattresses and allied products displayed for sale in brick and mortar stores, and deducing sales-related inferences therefrom. The present disclosure and the system, method, and computer program product described therein allow brick and mortar stores-which have hitherto typically abstained from imitating their online counterparts in rigorously tracking and analyzing customer behavior, and instead rely on more conventional avenues such as the voluntary feedback provided by customers and the feedback elicited by salespersons and marketing teams—to seamlessly track, analyze, and quantify customer interactions (with bedding mattresses and allied products displayed therein), and also deduce sales-related inferences, including customers' affinity towards certain brands of mattresses, and the probability of customers purchasing certain brand and type of mattresses. The emphasis of the present disclosure and in turn the system, method, and computer program product described therein is on effectively tracking customers' interactions and quantifying the tracked interactions to utilize the quantified interactions as a benchmark for deducing the probability of interacted mattresses sold-off to the customers who initiated the interaction. And also, the system, method, and computer program product emphasize on accurate identification of mattresses that induce frequent customer interactions and mattresses that offer recurring sales opportunities and generate directives describing how such mattresses-identified as inducing frequent customer interactions and offering frequent sales opportunities-could be optimally positioned within the brick and mortar stores to garner maximum possible attention from potential buyers. Further, the sales related inferences generated by the system, method, and computer program product are highly relevant to all the diversified stakeholders dispersed throughout the mattress supply chain, viz., manufacturers, retailers, and end customers. The system, method, and computer program product prove to be advantageous to the mattress manufacturers for they provide mattress manufacturers with the know-how about the types/variants of mattresses currently in demand, in the process identifying the stores that attract a comparatively higher number of customers to specific mattresses types/variants and brands. The system, method, and computer program product prove to be advantageous to the retailers for they provide retailers with a detailed view of the mattresses brands and types attracting a larger number of customers to the stores, allow retailers to single out (based on customer interaction data) mattresses appealing the most to the customers and the mattresses lacking in appeal, and enable retailers to finetune and optimize the on-floor location of the mattresses, again based on the customer interaction data. And lastly, the system, method, and computer program product are beneficial, at least indirectly, to the customers in that they prompt reorganization of floor space such that the customers get an opportunity to readily interact with most frequently selling mattresses and mattresses that historically attract more customers and thus could be inferred as better in terms of features, comfort and brand appeal or comfort inter-alia.

Further, the system, method, and computer program product also allow for the cumulative sales figures to be calculated in consideration of active customers—i.e., customers who actively engaged with, interacted with more than one mattress, instead of opting for the traditional approach where cumulative sales figures are always calculated vis-à-vis the total number of walk-in customers. While tracking online customers and calculating cumulative online sales is a straight forward task, extrapolating the same calculation technique onto brick and mortar stores is not a straightforward task, given the requirement to minutely track active customers. It is the phenomenon of tracking active customers, where the system, method, and computer program product holds a technical advantage over its online counterparts. Given that lease cost per square foot does not concern online e-commerce platforms as much as it does the brick and mortar retailers, the space available in a brick and mortar store must be optimally utilized, with the mattresses proven to be attracting comparatively higher number of customers (based on customer interaction data) positioned at prime locations of the store. The system, method, and computer program product, as discussed earlier, elicits customer interaction data from every mattress displayed in-store, analyzes the elicited customer interaction data, and generates directives for floor space optimization. Further, while online e-commerce platforms consider the total time spent by customers on specific product pages as a contributor to the analysis of cumulative sales figures when analyzing the cumulative sales figures of a brick and mortar store, it was hitherto impossible, or at the least highly difficult, for brick and mortar stores to track and analyze the time spent by the customers on the mattresses displayed therein. And while it was always possible, and rather, comparatively easier to track and analyze the total amount of time spent by each customer in the store, tracking and analyzing mattress engagement times of customers was an arduous and a near-impossible task. And, the system, method, and computer program product envisaged by the present disclosure make it possible for mattress-related time spent by customers to be minutely tracked and analyzed. Further, the system, method, and computer program product envisaged by the present disclosure provide for customer-mattress interactions across a multitude of brick and mortar stores (for example, across a multitude of franchisee brick and mortar stores) to be tracked, analyzed and programmatically collated, even though those franchisee brick and mortar stores may have been geographically dispersed and even though some of those stores may not possess any computer networking infrastructure necessary for establishing network connections with the remaining franchisee stores.

The system, method, and computer program product envisaged by the present disclosure alleviates brick and mortar retailers' difficulty in obtaining real-time customer-mattress interaction data. It enables brick and mortar retailers' also to implement retail data analytics, the hitherto lack of infrastructure for performing retail data analytics notwithstanding. Further, the system, method and computer program product envisaged by the present disclosure, bridges the gap between online e-commerce platforms and traditional brick and mortar stores, at least in terms of tracking customers' online activities, by enabling brick and mortar retailers also to track and capture customers' online activities and analyze them in the light of customers' in-store activities, to deduce (mattress) sales-related inferences. Further, it is possible that the system, method, and the computer product could be seamlessly integrated with multiple mattress recommendation systems, business analytics systems, accounting systems thereby facilitating seamless transfer of relevant information across the said systems, enhanced correlation between the said systems, and enhancement of customer-mattress detection and analysis. Further, the system, method, and computer program product envisaged by the present disclosure track not only customer-mattress interactions but also customer-salesperson interactions, based on customers' and salespersons' real-time location within the store vis-à-vis positioning of mattresses within the store. Also, the system, method, and computer program product allow for customer-mattress interactions to be selectively prioritized based on the number of customers interacting with a particular mattress at a given point in time. That is, information derived from an interaction between a pair of customers (for example, a couple) and a mattress is often provided a higher weightage in comparison to an interaction between a solo customer and a mattress, for the system, method and computer program product prioritizes the interaction initiated by two like-minded people at the same point in time and the information elicited from such an interaction.

What is claimed is:

1. A computer-implemented method for determining a customer's affinity towards a plurality of mattresses displayed in a brick-and-mortar store, and determining a probability of said customer purchasing at least one of said plurality of mattresses, based on said customer's affinity towards each of said plurality of mattresses, said method comprising the following computer-implemented steps:

embedding a plurality of pressure sensors in a predetermined order within each of said plurality of mattresses, and configuring each of said plurality of pressure sensors to be activated in response to an application of pressure thereupon, and communicably coupling each of said plurality of sensors to a processor installed within a computer-based device, and configuring each of said plurality of sensors to trigger said processor upon activation;

determining, by said processor, a mattress as occupied by said customer, only in an event at least some of said plurality of pressure sensors embedded within said mattress are activated, and identifying, by said processor, amongst said plurality of mattresses displayed in said brick-and-mortar store, mattresses occupied at least once by said customer, based on activation of corresponding pressure sensors embedded therein, and designating said mattresses occupied at least once by said customer as occupied mattresses;

determining, by said processor, said customer's position on each of said occupied mattresses, based on a sequence of activated pressure sensors within each of said occupied mattresses, a total number of activated pressure sensors within each of said occupied mattresses, and a cumulative pressure effect exhibited by said activated pressure sensors;

identifying, by said processor, a change of positions exhibited by said customer on each of said occupied mattresses, based on an analysis of at least a continuous change in said total number of activated pressure sensors, a continuous change in said sequence of activated pressure sensors, and a continuous change in said cumulative pressure effect exhibited by said activated pressure sensors;

identifying, by said processor, time elapsed before every change in said total number of activated pressure sensors, every change in said sequence of said activated pressure sensors, and every change in said cumulative pressure effect exhibited by said activated pressure sensors;

computing, by said processor, a total number of positions occupied by said customer on each of said occupied mattresses, based on a total number of times said total number of activated pressure sensors changed, a total number of times said sequence of said activated pressure sensors changed, and a total number of times said cumulative pressure effect exhibited by said activated pressure sensors changed;

computing, by said processor, time spent by said customer in each of said positions on each of said occupied mattresses by analyzing the time elapsed before every change in said total number of activated pressure sensors, every change in said sequence of said activated pressure sensors, and every change in said cumulative pressure effect exhibited by said activated pressure sensors, and computing, by said processor, a total time spent by said customer on each of said occupied mattresses;

implementing, by said processor, a neural network to determine said customer's affinity for each of said occupied mattresses, by providing to said first neural network as inputs, at least said sequence of activated pressure sensors, said total number of activated pressure sensors, said cumulative pressure effect exhibited by said activated pressure sensors, said plurality of positions occupied by said customer, said time spent by said customer in each of said plurality of positions, said continuous change in said number of activated pressure sensors, said continuous change in said cumulative pressure effect exhibited by said activated pressure sensors, and said total time spent by said customer;

determining, by said processor, an affinity score corresponding to each of said occupied mattresses, based at least in part on said customer's affinity for each of said occupied mattresses, and computing, by said processor, a probability of said customer purchasing at least one of said occupied mattresses, based on said affinity score attributed to each of said occupied mattresses.

2. The method as claimed in claim 1, wherein the method further includes the following steps:

programmatically assigning a unique customer identifier to said customer, in response to said customer visiting said brick-and-mortar store, and triggering an entry of said unique customer identifier on a memory module installed within said computer-based device;

programmatically assigning unique mattress identifiers to each of said plurality of mattresses positioned within said brick-and-mortar store, and triggering an entry of said unique mattress identifiers on said memory module; and programmatically linking, by said processor, said customer identifier to mattress identifiers corresponding to said occupied mattresses, and triggering storage of interlinked customer identifier and mattress identifiers in a relation table stored in said memory module.

3. The method as claimed in claim 1, wherein the method further includes steps of creating, by said processor, an indoor store map representing said brick-and-mortar store, and mapping, by said processor, respective locations of said plurality of mattresses displayed in said brick-and-mortar store, to said indoor store map, and rendering, by said processor, said indoor store map accessible on a user interface of said computer-based device.

4. The method as claimed in claim 3, wherein the method further includes the following steps:
configuring, by said processor, said indoor store map to selectively highlight each of said occupied mattresses; and
creating, by said processor, a virtual customer pathway, and configuring, by said processor, said virtual customer pathway to programmatically interlink positions of each of said occupied mattresses on said indoor store map, at least in an order in which each of said occupied mattresses were engaged by said customer.

5. The method as claimed in claim 1, wherein the step of embedding said plurality of sensors in said predetermined order, further includes a step of embedding said plurality of sensors as an ordered grid, said ordered grid incorporating said plurality of sensors across a predetermined number of rows and a predetermined number of columns created within each of said plurality of mattresses displayed in said brick-and-mortar store.

6. The method as claimed claim 1, wherein:
the step of identifying said continuous change of positions by said customer on each of said occupied mattresses, further includes a step of differentiating between sitting positions and sleeping positions taken up by said customer on each of said occupied mattresses, based on a difference in said sequence of activated pressure sensors, said total number of activated pressure sensors, and said cumulative pressure effect exhibited by said activated pressure sensors corresponding respectively to said sitting positions and said sleeping positions; and
the step of implementing a neural network to determine said customer's affinity for each of said occupied mattresses, further includes a step of triggering said neural network to implement a pattern recognition operation and determine a first set of parameters indicative of said customer's affinity for each of said occupied mattresses, and wherein the step of triggering said neural network to implement said pattern recognition operation to determine said first set of parameters, further includes the following steps:
triggering, by said processor, said neural network to learn a first pattern of activated pressure sensors indicative of said customer taking up said sitting positions on each of said occupied mattresses, a second pattern of activated pressure sensors indicative of said customer taking up said sleeping positions on each of said occupied mattresses, a total number of activated pressure sensors indicative of said customer taking up said sitting positions on each of said occupied mattresses, a total number of activated pressure sensors indicative of said customer taking up said sleeping positions on each of said occupied mattresses, cumulative pressure effect exhibited by activated pressure sensors located on each of said occupied mattresses in response to said customer taking up said sitting positions, cumulative pressure effect exhibited by activated pressure sensors located on each of said occupied mattresses in response to said customer taking up said sleeping positions;
triggering, by said processor, said neural network to learn a third pattern indicative of said continuous change in a sequence of activation of at least some of said plurality of pressure sensors embedded within each of said occupied mattresses, said continuous change in said total number of activated pressure sensors, and said continuous change in said cumulative pressure effect exhibited by said activated pressure sensors;
triggering, by said processor, said neural network to learn said time elapsed before every change in said total number of activated pressure sensors, in said sequence of activated pressure sensors, and in said cumulative pressure effect exhibited by said activated pressure sensors;
triggering, by said processor, said neural network to learn said total number of times said total number of activated pressure sensors changed, said total number of times said sequence of said activated pressure sensors changed, and said total number of times said cumulative pressure effect exhibited by said activated pressure sensors changed;
triggering, by said processor, said neural network to process said third pattern, said time elapsed before every change in said total number of activated pressure sensors, said sequence of activated pressure sensors, said cumulative pressure effect exhibited by said activated pressure sensors, said total number of times said total number of activated pressure sensors changed, said pattern of said activated pressure sensors changed, and said cumulative pressure effect exhibited by said activated pressure sensors changed, and learn each of said positions occupied by said customer on each of said occupied mattresses;
triggering, by said processor, said neural network to learn a fourth pattern indicative of said sequence of activation of said at least some of said plurality of pressure sensors in response to each of said positions, said total number of activated pressure sensors corresponding to each of said positions, said cumulative pressure effect exhibited by said activated pressure sensors in response to each of said positions; and
training said neural network by providing said first set of parameters to said neural network, in addition to said inputs, and further triggering said neural network to enhance said affinity score corresponding to each of said occupied mattresses.

7. The method as claimed in claim 1, wherein the step of determining a mattress as occupied by said customer, further includes a step of determining said mattress as being occupied by a second occupant in addition to said customer, only in an event at least some of said pressure sensors are simultaneously activated in at least two mutually different clusters, thereby exhibiting at least two mutually different cumulative pressure effects.

8. The method as claimed in claim 1, wherein the method further includes the following steps:
- tracking, by said processor, a plurality of mattress selection-related activities performed by said customer in respect of each of said occupied mattresses on a predetermined mattress shopping application installed on a handheld device accessible to said customer; and
- determining said affinity score based on said customer's affinity for each of said occupied mattresses, and further based said mattress selection-related activities tracked by said processor as performed by said customer in respect of each of said occupied mattresses.

9. The method as claimed in claim 8, wherein the step of tracking said mattress selection-related activities performed by said customer, further includes a step of tracking, by said processor, scanning of barcodes corresponding to said occupied mattresses, viewing of reviews corresponding to said occupied mattresses, liking web pages describing said occupied mattresses, disliking web pages describing said occupied mattresses, marking as favorite said web pages describing said occupied mattresses, and viewing of product description videos corresponding to said occupied mattresses.

10. A computer-readable storage medium having computer-readable instructions stored thereon, said instructions, when executed by a processor, cause said processor to:
- trigger a communicable coupling between said processor and a plurality of pressure sensors embedded in a predetermined order within a plurality of mattresses displayed in a brick-and-mortar store;
- configure each of said plurality of pressure sensors to be activated in response to application of pressure thereupon, and configure each of said plurality of sensors to trigger said processor upon activation;
- determine a mattress as occupied by said customer, only in an event at least some of said plurality of pressure sensors embedded within said mattress are activated, and identify amongst said plurality of mattresses displayed in said brick-and-mortar store, mattresses occupied at least once by said customer, based on activation of corresponding pressure sensors embedded therein, and designate said mattresses occupied at least once by said customer as occupied mattresses;
- determine said customer's position on each of said occupied mattresses, based on a sequence of activated pressure sensors within each of said occupied mattresses, a total number of activated pressure sensors within each of said occupied mattresses, and a cumulative pressure effect exhibited by said activated pressure sensors;
- identify a change of positions exhibited by said customer on each of said occupied mattresses, based on an analysis of at least a continuous change in said total number of activated pressure sensors, a continuous change in said sequence of activated pressure sensors, and a continuous change in said cumulative pressure effect exhibited by said activated pressure sensors;
- identify time elapsed before every change in said total number of activated pressure sensors, every change in said sequence of said activated pressure sensors, and every change in said cumulative pressure effect exhibited by said activated pressure sensors;
- compute a total number of positions occupied by said customer on each of said occupied mattresses, based on a total number of times said total number of activated pressure sensors changed, a total number of times said sequence of said activated pressure sensors changed, and a total number of times said cumulative pressure effect exhibited by said activated pressure sensors changed;
- compute time spent by said customer in each of said positions on each of said occupied mattresses, by analyzing the time elapsed before every change in said total number of activated pressure sensors, every change in said sequence of said activated pressure sensors, and every change in said cumulative pressure effect exhibited by said activated pressure sensors, and further compute a total time spent by said customer on each of said occupied mattresses;
- implement a neural network to determine said customer's affinity for each of said occupied mattresses, by providing to said first neural network as inputs, at least said sequence of activated pressure sensors, said total number of activated pressure sensors, said cumulative pressure effect exhibited by said activated pressure sensors, said plurality of positions occupied by said customer, said time spent by said customer in each of said plurality of positions, said continuous change in said number of activated pressure sensors, said continuous change in said cumulative pressure effect exhibited by said activated pressure sensors, and said total time spent by said customer; and
- determine an affinity score corresponding to each of said occupied mattresses, based at least in part on said customer's affinity for each of said occupied mattresses, and compute a probability of said customer purchasing at least one of said occupied mattresses, based on said affinity score attributed to each of said occupied mattresses.

11. The computer-readable instructions as claimed in claim 10, wherein said instructions, when executed by said processor, further cause said processor to:
- programmatically assign a unique customer identifier to said customer, in response to said customer visiting said brick-and-mortar store, and trigger an entry of said unique customer identifier on said memory module;
- programmatically assign unique mattress identifiers to each of said plurality of mattresses positioned within said brick-and-mortar store, and trigger an entry of said unique mattress identifiers on said memory module;
- programmatically link said customer identifier to mattress identifiers corresponding to said occupied mattresses, and trigger storage of interlinked customer identifier and mattress identifiers in a relation table stored in said memory module;
- create an indoor store map representing said brick-and-mortar store, and map respective locations of said plurality of mattresses displayed in said brick-and-mortar store, to said indoor store map, and render said indoor store map accessible on a user interface triggerable by said processor;
- establish said communicable coupling with said plurality of sensors arranged as an ordered grid, said ordered grid incorporating said plurality of sensors across a predetermined number of rows and a predetermined number of columns created within each of said plurality of mattresses displayed in said brick-and-mortar store;
- differentiate between sitting positions and sleeping positions taken up by said customer on each of said occupied mattresses, based on a difference in said sequence of activated pressure sensors, said total number of activated pressure sensors, and said cumulative pressure effect exhibited by said activated pressure sensors corresponding respectively to said sitting positions and said sleeping positions;

trigger said neural network to implement a pattern recognition operation and learn a first set of parameters indicative of said customer's affinity for each of said occupied mattresses;

trigger said neural network to process said third pattern, said time elapsed before every change in said total number of activated pressure sensors, said sequence of activated pressure sensors, said cumulative pressure effect exhibited by said activated pressure sensors, said total number of times said total number of activated pressure sensors changed, said pattern of said activated pressure sensors changed, and said cumulative pressure effect exhibited by said activated pressure sensors changed; trigger said neural network to learn each of said positions occupied by said customer on each of said occupied mattresses;

train said neural network by providing said first set of parameters to said neural network, in addition to said inputs, and trigger said neural network to enhance said affinity score corresponding to each of said occupied mattresses;

determine a mattress as being occupied by a second occupant in addition to said customer, only in an event at least some of said pressure sensors are simultaneously activated in at least two mutually different clusters, thereby exhibiting at least two mutually different cumulative pressure effects;

configure said indoor store map to selectively highlight each of said occupied mattresses, and creates a virtual customer pathway programmatically interlinking positions of each of said occupied mattresses on said indoor store map, at least in an order in which each of said occupied mattresses were engaged by said customer;

track a plurality of mattress selection-related activities performed by said customer in respect of each of said occupied mattresses on a predetermined mattress shopping application installed on a handheld device accessible to said customer; and determine said affinity score based on said customer's affinity for each of said occupied mattresses, and further based on said mattress selection-related activities performed by said customer in respect of each of said occupied mattresses.

12. The computer-readable instructions as claimed in claim 11, wherein said first set of parameters learnt by said neural network include:

a first pattern of activated pressure sensors indicative of said customer taking up said sitting positions on each of said occupied mattresses, a second pattern of activated pressure sensors indicative of said customer taking up said sleeping positions on each of said occupied mattresses, a total number of activated pressure sensors indicative of said customer taking up said sitting positions on each of said occupied mattresses, a total number of activated pressure sensors indicative of said customer taking up said sleeping positions on each of said occupied mattresses, cumulative pressure effect exhibited by activated pressure sensors located on each of said occupied mattresses in response to said customer taking up said sitting positions, cumulative pressure effect exhibited by activated pressure sensors located on each of said occupied mattresses in response to said customer taking up said sleeping positions; a third pattern indicative of said continuous change in a sequence of activation of at least some of said plurality of pressure sensors embedded within each of said occupied mattresses, said continuous change in said total number of activated pressure sensors, and said continuous change in said cumulative pressure effect exhibited by said activated pressure sensors;

said time elapsed before every change in said total number of activated pressure sensors, in said sequence of activated pressure sensors, and in said cumulative pressure effect exhibited by said activated pressure sensors, said total number of times said total number of activated pressure sensors changed, said total number of times said sequence of said activated pressure sensors changed, and said total number of times said cumulative pressure effect exhibited by said activated pressure sensors changed;

a fourth pattern indicative of said sequence of activation of said at least some of said plurality of pressure sensors in response to each of said positions, said total number of activated pressure sensors corresponding to each of said positions, said cumulative pressure effect exhibited by said activated pressure sensors in response to each of said positions; and each of said positions occupied by said customer on each of said occupied mattresses.

13. A computer-implemented system for determining a customer's affinity towards a plurality of mattresses displayed in a brick-and-mortar store, and determining a probability of said customer purchasing at least one of said plurality of mattresses, based on said customer's affinity towards each of said plurality of mattresses, said system comprising:

at least one processor;

at least one memory module storing computer program code, and communicably coupled to said processor, wherein said memory module and computer program code stored thereon are configured, with said processor, to cause said computer-implemented system to:

trigger a communicable coupling between said processor and a plurality of pressure sensors embedded in a predetermined order within each of said plurality of mattresses;

configure each of said plurality of pressure sensors to be activated in response to an application of pressure thereupon, and configure each of said plurality of sensors to trigger said processor upon activation;

determine a mattress as occupied by said customer, only in an event at least some of said plurality of pressure sensors embedded within said mattress are activated, and identify amongst said plurality of mattresses displayed in said brick-and-mortar store, mattresses occupied at least once by said customer, based on activation of corresponding pressure sensors embedded therein, and designate said mattresses occupied at least once by said customer as occupied mattresses;

determine said customer's position on each of said occupied mattresses, based on a sequence of activated pressure sensors within each of said occupied mattresses, a total number of activated pressure sensors within each of said occupied mattresses, and a cumulative pressure effect exhibited by said activated pressure sensors;

identify a change of positions exhibited by said customer on each of said occupied mattresses, based on an analysis of at least a continuous change in said total number of activated pressure sensors, a continuous change in said sequence of activated pressure sensors, and a continuous change in said cumulative pressure effect exhibited by said activated pressure sensors;

identify time elapsed before every change in said total number of activated pressure sensors, every change in said sequence of said activated pressure sensors, and every change in said cumulative pressure effect exhibited by said activated pressure sensors;

compute a total number of positions occupied by said customer on each of said occupied mattresses, based on a total number of times said total number of activated pressure sensors changed, a total number of times said sequence of said activated pressure sensors changed, and a total number of times said cumulative pressure effect exhibited by said activated pressure sensors changed;

compute time spent by said customer in each of said positions on each of said occupied mattresses, by analyzing the time elapsed before every change in said total number of activated pressure sensors, every change in said sequence of said activated pressure sensors, and every change in said cumulative pressure effect exhibited by said activated pressure sensors, and further compute a total time spent by said customer on each of said occupied mattresses;

implement a neural network to determine said customer's affinity for each of said occupied mattresses, by providing to said first neural network as inputs, at least said sequence of activated pressure sensors, said total number of activated pressure sensors, said cumulative pressure effect exhibited by said activated pressure sensors, said plurality of positions occupied by said customer, said time spent by said customer in each of said plurality of positions, said continuous change in said number of activated pressure sensors, said continuous change in said cumulative pressure effect exhibited by said activated pressure sensors, and said total time spent by said customer; and determine an affinity score corresponding to each of said occupied mattresses, based at least in part on said customer's affinity for each of said occupied mattresses, and compute a probability of said customer purchasing at least one of said occupied mattresses, based on said affinity score attributed to each of said occupied mattresses.

14. The system as claimed in claim 13, wherein said processor is further configured to:
programmatically assign a unique customer identifier to said customer, in response to said customer visiting said brick-and-mortar store, and trigger an entry of said unique customer identifier on said memory module;
programmatically assign unique mattress identifiers to each of said plurality of mattresses positioned within said brick-and-mortar store, and trigger an entry of said unique mattress identifiers on said memory module; and
programmatically link said customer identifier to mattress identifiers corresponding to said occupied mattresses, and trigger storage of interlinked customer identifier and mattress identifiers in a relation table stored in said memory module.

15. The system as claimed in claim 13, wherein said processor is further configured to create an indoor store map representing said brick-and-mortar store, and map respective locations of said plurality of mattresses displayed in said brick-and-mortar store to said indoor store map, and render said indoor store map accessible on a user interface triggerable by said processor.

16. The system as claimed in claim 15, wherein said processor configures said indoor store map to selectively highlight each of said occupied mattresses, and creates a virtual customer pathway programmatically interlinking positions of each of said occupied mattresses on said indoor store map, at least in an order in which each of said occupied mattresses were engaged by said customer.

17. The system as claimed in claim 13, wherein said processor is further configured to establish said communicable coupling with said plurality of sensors arranged as an ordered grid, said ordered grid incorporating said plurality of sensors across a predetermined number of rows and a predetermined number of columns created within each of said plurality of mattresses displayed in said brick-and-mortar store.

18. The system as claimed in claim 13, wherein said processor is further configured to:
differentiate between sitting positions and sleeping positions taken up by said customer on each of said occupied mattresses, based on a difference in said sequence of activated pressure sensors, said total number of activated pressure sensors, and said cumulative pressure effect exhibited by said activated pressure sensors corresponding respectively to said sitting positions and said sleeping positions;
trigger said neural network to implement a pattern recognition operation and learn a first set of parameters indicative of said customer's affinity for each of said occupied mattresses, said first set of parameters including:
a first pattern of activated pressure sensors indicative of said customer taking up said sitting positions on each of said occupied mattresses, a second pattern of activated pressure sensors indicative of said customer taking up said sleeping positions on each of said occupied mattresses, a total number of activated pressure sensors indicative of said customer taking up said sitting positions on each of said occupied mattresses, a total number of activated pressure sensors indicative of said customer taking up said sleeping positions on each of said occupied mattresses, cumulative pressure effect exhibited by activated pressure sensors located on each of said occupied mattresses in response to said customer taking up said sitting positions, cumulative pressure effect exhibited by activated pressure sensors located on each of said occupied mattresses in response to said customer taking up said sleeping positions;
a third pattern indicative of said continuous change in a sequence of activation of at least some of said plurality of pressure sensors embedded within each of said occupied mattresses, said continuous change in said total number of activated pressure sensors, and said continuous change in said cumulative pressure effect exhibited by said activated pressure sensors;
said time elapsed before every change in said total number of activated pressure sensors, in said sequence of activated pressure sensors, and in said cumulative pressure effect exhibited by said activated pressure sensors, said total number of times said total number of activated pressure sensors changed, said total number of times said sequence of said activated pressure sensors changed, and said total number of times said cumulative pressure effect exhibited by said activated pressure sensors changed;

a fourth pattern indicative of said sequence of activation of said at least some of said plurality of pressure sensors in response to each of said positions, said total number of activated pressure sensors corresponding to each of said positions, said cumulative pressure effect exhibited by said activated pressure sensors in response to each of said positions; and each of said positions occupied by said customer on each of said occupied mattresses;

and wherein said processor is further configured to train said neural network by providing said first set of parameters to said neural network, in addition to said inputs, said processor triggering said neural network to enhance said affinity score corresponding to each of said occupied mattresses.

19. The system as claimed in claim 18, wherein said processor is further configured to trigger said neural network to process said third pattern, said time elapsed before every change in said total number of activated pressure sensors, said sequence of activated pressure sensors, said cumulative pressure effect exhibited by said activated pressure sensors, said total number of times said total number of activated pressure sensors changed, said pattern of said activated pressure sensors changed, and said cumulative pressure effect exhibited by said activated pressure sensors changed, said processor further configured to trigger said neural network to learn each of said positions occupied by said customer on each of said occupied mattresses.

20. The system as claimed in claim 13, wherein said processor is further configured to:
track a plurality of mattress selection-related activities performed by said customer in respect of each of said occupied mattresses on a predetermined mattress shopping application installed on a handheld device accessible to said customer; and
determine said affinity score based on said customer's affinity for each of said occupied mattresses, and further based on said mattress selection-related activities performed by said customer in respect of each of said occupied mattresses.

21. The system as claimed in claim 20, wherein said plurality of mattress selection-related activities performed by said customer are selected from a group of activities consisting of scanning of barcodes corresponding to said occupied mattresses, viewing of reviews corresponding to said occupied mattresses, liking web pages describing said occupied mattresses, disliking web pages describing said occupied mattresses, marking as favorite said web pages describing said occupied mattresses, and viewing of product description videos corresponding to said occupied mattresses.

22. The system as claimed in claim 13, wherein said processor is further configured to determine a mattress as being occupied by a second occupant in addition to said customer, only in an event at least some of said pressure sensors are simultaneously activated in at least two mutually different clusters, thereby exhibiting at least two mutually different cumulative pressure effects.

\* \* \* \* \*